United States Patent
Soffer

(10) Patent No.: US 10,855,470 B2
(45) Date of Patent: Dec. 1, 2020

(54) USB SECURITY GATEWAY

(71) Applicant: High Sec Labs Ltd., Caesarea (IL)

(72) Inventor: Aviv Soffer, Geva Carmel (IL)

(73) Assignee: HIGH SEC LABS LTD., Yokneam Industrial Zone (IL)

( * ) Notice: Subject to any disclaimer, the term of this patent is extended or adjusted under 35 U.S.C. 154(b) by 287 days.

(21) Appl. No.: 15/834,536

(22) Filed: Dec. 7, 2017

(65) Prior Publication Data

US 2018/0097629 A1    Apr. 5, 2018

Related U.S. Application Data

(63) Continuation of application No. 14/306,352, filed on Jun. 17, 2014, now abandoned.

(51) Int. Cl.
| | | |
|---|---|---|
| H04L 9/32 | (2006.01) | |
| G06F 21/85 | (2013.01) | |
| G06F 13/10 | (2006.01) | |
| G06F 21/82 | (2013.01) | |

(52) U.S. Cl.
CPC .......... *H04L 9/3234* (2013.01); *G06F 13/105* (2013.01); *G06F 21/82* (2013.01); *G06F 21/85* (2013.01)

(58) Field of Classification Search
CPC ..... H04L 9/3234; G06F 21/85; G06F 13/105; G06F 21/82
See application file for complete search history.

(56) References Cited

U.S. PATENT DOCUMENTS

| | | | |
|---|---|---|---|
| 6,324,605 B1 | 11/2001 | Rafferty et al. | |
| 6,378,009 B1 | 4/2002 | Pinkston, II et al. | |
| 7,320,071 B1 | 1/2008 | Friedman et al. | |
| 7,478,235 B2 | 1/2009 | England et al. | |
| 7,559,092 B2 | 7/2009 | Anson et al. | |
| 9,501,157 B2* | 11/2016 | Soffer | G06F 3/023 |
| 2002/0166067 A1* | 11/2002 | Pritchard | H04L 63/145 |
| | | | 726/4 |
| 2004/0003262 A1 | 1/2004 | England et al. | |
| 2004/0177264 A1* | 9/2004 | Anson | G06F 21/84 |
| | | | 726/34 |
| 2006/0123182 A1* | 6/2006 | Sandulescu | G06F 3/023 |
| | | | 710/316 |
| 2007/0250546 A1 | 10/2007 | Muhlhausser et al. | |
| 2007/0299650 A1* | 12/2007 | Tamayo | G06F 13/105 |
| | | | 703/27 |

(Continued)

FOREIGN PATENT DOCUMENTS

| | | |
|---|---|---|
| EP | 1916612 | 4/2008 |
| EP | 2136310 | 12/2009 |

(Continued)

*Primary Examiner* — Cheng-Feng Huang
(74) *Attorney, Agent, or Firm* — Browdy and Neimark, PLLC

(57) ABSTRACT

A USB security gateway device is integrated within a host computer. The USB security gateway device is used for protecting a USB port of a host computer against interaction with unauthorized USB device. The USB security gateway device qualifies any USB peripheral device before it allows it to interact with the host device. Qualification parameters are stored in the USB security gateway device and are reprogrammable.

20 Claims, 16 Drawing Sheets

(56) References Cited

U.S. PATENT DOCUMENTS

| | | | |
|---|---|---|---|
| 2008/0040796 A1* | 2/2008 | Takasu | H04W 12/06 726/18 |
| 2009/0049307 A1 | 2/2009 | Lin | |
| 2011/0145451 A1* | 6/2011 | Soffer | G06F 13/00 710/64 |
| 2011/0208963 A1* | 8/2011 | Soffer | G06F 21/556 713/168 |
| 2011/0265156 A1 | 10/2011 | Bombay | |
| 2012/0042099 A1 | 2/2012 | Wong et al. | |
| 2013/0035098 A1 | 2/2013 | Das | |
| 2013/0050084 A1 | 2/2013 | Soffer | |
| 2013/0067534 A1 | 3/2013 | Soffer | |
| 2013/0111100 A1 | 5/2013 | Ghosh | |
| 2013/0132758 A1* | 5/2013 | Shiba | G06F 1/266 713/340 |
| 2013/0179940 A1 | 7/2013 | Krummel | |
| 2014/0015673 A1 | 1/2014 | Soffer | |
| 2014/0019652 A1 | 1/2014 | Soffer | |
| 2014/0053256 A1 | 2/2014 | Soffer et al. | |
| 2014/0127927 A1 | 5/2014 | Leng | |
| 2014/0283083 A1 | 9/2014 | Gula | |

FOREIGN PATENT DOCUMENTS

| | | |
|---|---|---|
| EP | 2181394 | 6/2013 |
| WO | 03/009118 | 1/2003 |
| WO | 2013035098 A1 | 3/2013 |

* cited by examiner

Device White-list (120a)

| No. | Class ID | Sub-class | Protocol | VID | PID | S/N | Map to | Dir |
|---|---|---|---|---|---|---|---|---|
| 1 | 03 - HID | 01 | 01 | 054e | 0752 | * | + + + + | N N R W |
| 2 | | | | | | | | |
| 3 | | | | | | | | |
| 4 | | | | | | | | |

Device Black-list (120b)

| No. | Class ID | Sub-class | Protocol | VID | PID | S/N | Map to | Dir |
|---|---|---|---|---|---|---|---|---|
| 1 | 03 - HID | 02h | 02 | 051e | 0750 | * | | N N N N |
| 2 | | | | | | | | |
| 3 | | | | | | | | |
| 4 | | | | | | | | |

Device Read (120c)

| No. | Class ID | Sub-class | Protocol | VID | PID | S/N | Map to | Dir |
|---|---|---|---|---|---|---|---|---|
| 1 | | | | | | | | |
| 2 | | | | | | | | |
| 3 | | | | | | | | |
| 4 | | | | | | | | |

103, 104, 105, 106, 107, 108, 109, 110

USB SECURITY GATEWAY

FIELD OF THE INVENTION

The present invention relates to a Secure USB Gateway device capable of securely communicate with a plurality of USB peripheral devices and one or more host computers. More specifically the present invention relates to a device capable of enforcing a detailed USB peripherals security policy on connected computer.

BACKGROUND OF THE INVENTION

Computer networks in many organizations are continuously challenged by various security threats. The popularity of the internet and the availability of portable mass-storage devices introduce severe internal and external threats to most organizations. Defense and government organizations with higher security networks are forced to isolate their secure networks from other less secure networks thus creating a situation that a single organization or a single employee need to operate in several different isolated networks having different security levels. Isolation between these networks is a key concern as a small leakage of data between two networks may cause catastrophic results to the organization involved.

In the past several years many of the traditional and new isolation methods became ineffective and therefore today the physical separation between networks is growing in popularity among high security organizations. The concept of multiple highly isolated networks is gaining popularity in defense and government organizations.

Often, a user of multiple host computers is required to use a shared rescores such as a common keyboard, common mouse or other peripheral devices such as a shared authentication card, printer or audio devices.

This concept requires either multiple user consoles or a KVM switch.

There are several disadvantages for equipping a user with multiple consoles: Desktop space required; Cost of peripherals; Security issues caused by user's confusion; Lack of unified working environment.

KM and KVM offers an improvement compared to multiple user consoles approach. KVM enables a single set of user keyboard, mouse and display to be switched between isolated hosts. Commercial KVMs are common low-cost peripheral product available from many vendors for many years now. There are many information security risks in commercial KVMs and in the past few years these products are regarded as unsafe for high security networks.

Any computer data port, such as a USB port may become a data security risk as unauthorized mass storage device connected to an unprotected port may be used for importing sensitive information and later removing the device with the data for hostile use.

Similarly, an unprotected port may be used for infecting a host computer with malicious codes.

REFERENCED PATENTS AND APPLICATIONS

European Application EP2136310 A1 titled: "Host device system with USB port security" teaches a method of securing USB by filtering its connected devices. While this prior-art method may increase the security by adding USB filtration layer, this layer completely dependent on software running at the computer. Such software security layer may be hacked or circumvented by an experienced user or attacker. Most prior-art USB port security solutions are software component running on the host. What is needed is a USB security device that is completely independent from the host to prevent attack and modification by hacked host computer.

European application EP2181394 A2, titled: "Method of protecting input/output packet of usb device and apparatus thereof" teaches another host based software prior-art method to enhance USB ports security. This prior-art solution again is completely dependent on the host computer to operate and therefore is not secure enough. U.S. Application 20050216620 A1, titled: "KVM and USB peripheral switch"; to Francisc; et al. discloses a system and method for switching KVM and peripheral interfaces between host interfaces. Provided is a KVM switch where a keyboard and a mouse are emulated at host interfaces of the KVM switch and hosts are emulated at keyboard and mouse interfaces of the KVM switch. In addition, the KVM switch provided is capable of switching, either independently or concurrently with a keyboard and mouse, additional peripherals, such as USB peripherals.

U.S. application 20060123182; titled: "Distributed KVM and peripheral switch"; to Francisc; et al.; discloses a system and method for switching keyboard and mouse devices and video displays, as well as USB peripheral devices, between USB hosts and video sources over extended distances. Provided is a distributed KVM and peripheral switch where a USB keyboard and mouse is emulated to the host interfaces of the KVM and peripheral switch and a USB host is emulated to keyboard and mouse interfaces of the KVM and peripheral switch. In addition, the keyboard, mouse, display and peripheral devices are separated from the hosts and video sources by a non-USB communications channel.

U.S. Pat. No. 7,559,092; titled "Secured KVM switch"; to Anson, et al.; discloses method that supports secure input/output (I/O) communications between an I/O device and a data processing system via a keyboard, video, and mouse (KVM) switch. An example embodiment includes the operations of establishing a first secure communication channel between the KVM switch and the I/O device and establishing a second secure communication channel between the KVM switch and the data processing system. In addition, I/O data may be received at the KVM switch from the I/O device via the first secure communication channel. In response to receipt of the I/O data from the I/O device, the I/O data may be transmitted from the KVM switch to the data processing system via the second secure communication channel. Embodiments may also include support for non-secure channels between the KVM switch and nonsecured I/O devices, nonsecured data processing systems, or both.

WO 2003009118; titled "Computer multiplexor" discloses a computer multiplexor connects a keyboard and mouse via interfaces to configuration stores and link enable devices respectively. Certain of the connections are unidirectional: they provide for arranged to inhibit communication between the plurality of computers while providing for necessary data flow to and from one of the plurality of computers selected for operation in conjunction with the multiplexor.

Additional background information may be found in the following patent applications to the same inventor:
U.S. 20110208963 Secured KVM system having remote controller-indicator
U.S. 20130050084 Secure KVM system having multiple emulated EDID functions U.S. 20130067534 Computer motherboard having peripheral security functions
U.S. 20140053256 User authentication device having multiple isolated host interfaces
U.S. 20110145451 Isolated multi-network computer system and apparatus
U.S. 20140015673 Secure peripheral connecting device
U.S. 20140019652 Secure km switch
WO 2013035098 Single optical fiber KVM extender

SUMMARY OF THE EMBODIMENTS

Some exemplary embodiments of the current invention provide a stand alone unit that performs at least some of the functionality of dedicated peripheral port switching subsystem. Some exemplary embodiments of the current invention provide improved functionality of the dedicated peripheral port switching subsystem.

Some exemplary embodiments of the current invention provide improved functionality of the dedicated peripheral port switching subsystem.

Some exemplary embodiments of the current invention provides the functionality of the dedicated peripheral port switching subsystem in a stand alone unit or in a unit integrated within a host computer.

Some exemplary embodiments of the current invention add functionality missing in the prior art devices, for example (and not limited to):
  1. Fixed dedicated peripheral filter—for example a USB security filter designed to enable only Human Interface Devices (HID Class USB).
  2. Field updateable profiles used to allow or block connection of specific or classes of devices.
  3. Sniffing and monitoring data exchanged between the connected device and the host.
  4. Detection of disconnection or resetting the device as a way to prevent exchanging of an approved connected device with a fake, doctored, compromised or offending device.
  5. Creating a table that maps the operational permissions of devices to specific ports as a way to create a flexible operational and security matrix (detailed in FIG. 11). In this way, devices permitted to connect to some host computers will be prevented from connecting to other host computers.
    a. The operational and security matrix may be updated.
    b. The operational and security matrix may comprise White list (approved devices) and black list (blocked devices)
    c. The operational and security matrix may be updated by capturing the profile of a connected device.

In some exemplary embodiments of the current invention the device may be used to securely connect a single approved peripheral device to a single host computer. To achieve this, the device may be programmed to allow connection of only a limited set (or just one) approved peripheral device, and reject any other peripheral device when attempting to connect it.

In some exemplary embodiments of the current invention the device may be used as a secure KM (Keyboard and mouse) switch allowing one user to interact with a plurality of host computers using a single set of keyboard and mouse while preventing any data leak between the connected host computers. To achieve this, the device may be programmed to allow data flow only from the KM to the selected host, while preventing any data flow of data in the other direction.

As an added layer of security, the device, when acting as a KM switch, may be programmed to reject any devices other than approved KM.

In some embodiments, the device may be used to allow connecting a single security device such as a card reader or biometric reader to a plurality of host computers.

In some embodiments, the device may be used to allow secure sharing of resources other than KM or card reader. For example Touch-screen, Audio devices, camera or other sensors, mass storage device or shared encrypted mass storage device, shared scanner, printer, etc.

For example, a single backup mass storage device may be connected to a plurality of host computers. The inventive device may be ensured the isolation of the host computer by enforcing unidirectional data flow only to the backup mass storage device while preventing any data flow to the host computers. Similarly, a shared printer may be securely used. As an added layer of security, the inventive device, when used for printer sharing, may be programmed to reject any devices other than approved printer, Thus preventing connecting a removable storage device, for example a Disk On Key (DOK) in an attempt to copy sensitive information.

A man skilled in the art or Information Technology (IT) will be able to program the inventive devices to meet many security needs.

It is one object of the current invention to provide a secure serial communication gateway device comprising: at least one first serial communication host connector, to connect to at least one first a host computer;
  a serial communication peripheral device port to connect to a peripheral device; and
  a security circuitry comprising:
  a pre-qualification microcontroller;
  a mode select switch connected to said serial communication peripheral device port and selectively connecting said serial communication peripheral device port to the selected one of:
  said pre-qualification microcontroller; and
  said first serial communication host connector; and
  a serial communication enumeration and reset detector, connected to said serial communication peripheral device port, to monitor said serial communication peripheral device port and casing said mode select switch to switch said serial communication peripheral device port to said pre-qualification microcontroller when said serial communication device is disconnected from said serial communication peripheral device port;
  wherein said pre-qualification microcontroller is capable of enumerating a connected peripheral device according to a table of peripheral device qualifications,
  and wherein said table of peripheral device qualifications may be field re-programmed.

In some embodiments the secure serial communication gateway is a stand alone unit.

In some embodiments the serial communication is USB protocol.

In some embodiments the serial communication enumeration and reset detector is a USB hub.

In some embodiments the serial communication enumeration and reset detector is selected from a group consisting of: electromechanical switch capable of detecting disconnection of a plug from said serial communication peripheral device port; a current sensor capable of detecting decreased current from said serial communication peripheral device port to said peripheral device; a pull-up resistors detector capable of detecting disconnection of said peripheral device from said serial communication peripheral device port; and data flow monitoring unit capable of monitoring data flow between said peripheral device and said at least one first a host computer.

In some embodiments the security circuitry further comprises: a host USB hub inserted between said mode select switch and said at least one first serial communication host connector; and a security microcontroller connected to said host USB hub for enumerating said at least one first a host compute.

In some embodiments the security microcontroller is a USB token.

In some embodiments the at least one first serial communication host connector is a USB cable terminating with an eLock plug, wherein said eLock plug compromises:
- a USB plug capable of interfacing with a USB jack of said host computer;
- at least one locking tooth capable of protruding from said USB plug, thus locking the eLock to the USB jack of said host computer; and
- a solenoid capable of enabling and unlocking said at least one locking tooth from the USB jack of the host computer.

In some embodiments the serial communication is selected from the group consisting of: USB 2.0, USB 3.0, USB 3.1, Thunderbolt, and Firewire.

In some embodiments the secure serial communication gateway further comprising:
- at least one second serial communication host connector, to connect to at least one second host computer; and
- a host selection switch controlled by said pre-qualification microcontroller, to switch data exchange with said peripheral device among the plurality of connected host computers.

In some embodiments the table of peripheral device qualifications further associates peripheral device qualifications to each host connector.

In some embodiments the table associates with each of said host connector at least one of:
- a black list, listing qualifications of peripheral device to be blocked from connecting to each of said host connectors; and
- a white list, listing qualifications of peripheral device to be allowed to connect to each of said host connectors.

In some embodiments the security circuitry is capable of enforcing one of:
- unidirectional data flow from said peripheral device to the selected host computer; and
- unidirectional data flow from the selected host computer to said peripheral device;
- and wherein said table associates at least one peripheral device qualification and each of said host connector at least one of:
- unidirectional data flow from said peripheral device to the selected host computer;
- unidirectional data flow from the selected host computer to said peripheral device;
- bidirectional data flow between the selected host computer and said peripheral device;
- no data flow between the selected host computer and said peripheral device.

In some embodiments the peripheral device qualifications are selected from the group consisting of: USB class, USB sub-class, USB protocol, USB Vendor ID, USB Product ID, USB serial number.

In some embodiments the secure serial communication gateway further comprises a programming port connected to said pre-qualification microcontroller, to connect to a programmer device for field re-programming of said table of peripheral device qualifications.

In some embodiments the security circuitry is capable of preparing and storing an event log file based on monitoring the activity of the secure serial communication gateway device, and transmitting said event log file via said programming port.

In some embodiments the field re-programming of said table of peripheral device qualifications comprises capturing qualifications of a peripheral device connected to said peripheral device port during the re-programming process.

In some embodiments the field re-programming of said table of peripheral device qualifications is performed via said peripheral device port.

In some embodiments the secure serial communication gateway further comprises a tamper detector capable of detecting attempt to compromise the secure serial communication gateway and permanently disable said secure serial communication gateway when detecting an attempt to compromise the secure serial communication gateway.

It is another object of the current invention to provide a Secure USB jack device comprising:
- at least one first USB host port having a plurality of pins to connect to the motherboard of a host computer;
- at least one first USB jack to connect to a first USB device; and
- a security circuitry comprising:
- a pre-qualification microcontroller;
- at least one first mode select switch connected to said first USB jack and selectively connecting said first USB jack to the selected one of:
- said pre-qualification microcontroller; and
- said first USB host port;
- wherein said plurality of pins fits the standard USB jack footprint.

In some embodiments the Secure USB jack further comprises:
- one second USB host port to connect to said motherboard of said host computer;
- at least one second USB jack to connect to a second USB device,
- wherein said security circuitry further comprising:
- one second mode select switch connected to said second USB jack and selectively connecting said second USB jack to the selected one of:
- said pre-qualification microcontroller; and
- said second USB host port.

In some embodiments the Secure USB jack device of further comprises: a USB enumeration and reset detector function, connected to said at least one first USB jack, to monitor said at least one first USB jack.

In some embodiments the Secure USB jack device further comprises a programming port connected to said pre-qualification microcontroller.

In some embodiments the Secure USB jack device further comprising at least one status indicator LED connected to said pre-qualification microcontroller.

In some embodiments the Secure USB jack device further comprises a metal cover encasing the Secure USB jack device, wherein said security circuitry is in a form of a small printed circuit fitted within said cover the Secure USB jack device.

It is yet another object of the current invention to provide a USB filter comprising:
- a USB jack to connect to a USB device of a preset class;
- a USB host emulator connected to said a USB jack to emulate a host computer;

a USB device emulator connected to said USB host emulator to emulate only a generic USB device of the same preset class as said USB device of a preset class; and at USB host port to connect to a host computer.

In some embodiments the USB device of a known class is selected from the group consisting: a keyboard, and a mouse.

In some embodiments the USB filter is attached to the motherboard of said host computer, and is within the enclosure of said host computer.

In some embodiments the USB filter is inserted into a USB jack of said host computer.

In some embodiments the USB filter is locked to a USB jack of said host computer.

In some embodiments the USB filter further comprises a unidirectional data link enforcing unidirectional data flow only from said host emulator to said device emulator.

In some embodiments the USB filter further comprises a system controller connected to said host emulator to provide management and security by monitoring the data exchange between said USB device and said host computer.

In some embodiments the system controller is capable of disabling said filter if a USB device of a class other then said USB device of a preset class is connected to said USB jack.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 11 Schematically illustrates screens of the programming software used for configuring of a Secure USB Gateway device according to an exemplary embodiment of the current invention.

DETAILED DESCRIPTION OF THE DRAWINGS

Figure 1:
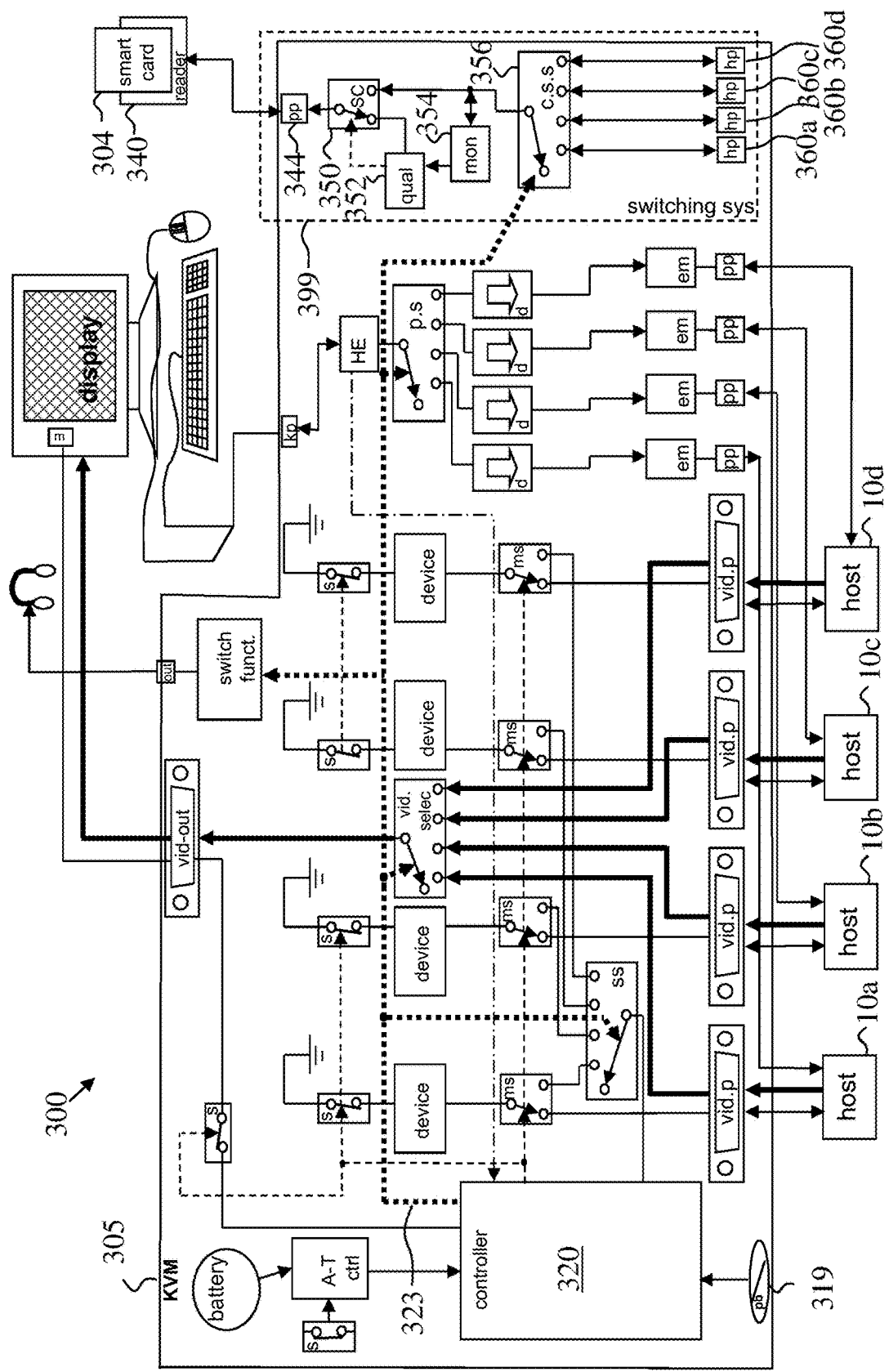
FIG. 1 Is adopted from FIG. 6 of U.S. application Ser. No. 13/509,193 and schematically illustrates a high-level block diagram of a prior-art Secure KVM having a Dedicated Peripheral Port sub-system.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as subroutines in an operating system, may be functions in an installed software package, and the like.

In the figures and text herein, the term "x" following a number may indicate any one of similar or identical elements marked by that number.

Figure 6:
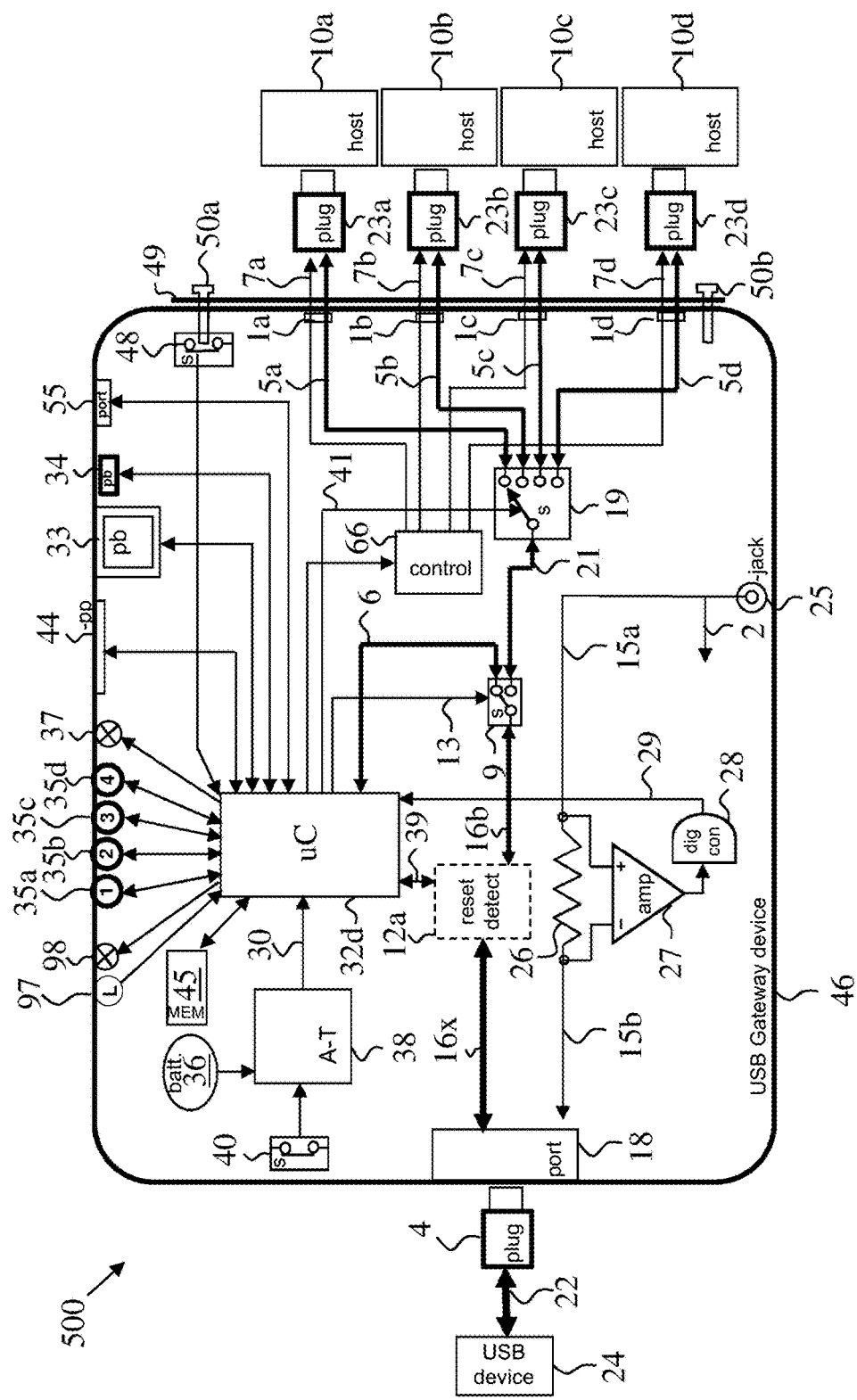
FIG. 6 schematically illustrates a high-level block diagram of a Secure USB Gateway device according to an exemplary embodiment of the current invention having a USB prequalification function and 4 ports USB switching function.

FIG. 1 which is adopted from FIG. 6 of U.S. application Ser. No. 13/509,193 which is incorporated herein by reference. The figure schematically illustrates a high-level block diagram of a prior-art Secure KVM having a Dedicated Peripheral Port sub-system. The figure a secure KVM device having a switchable CAC (Common Access Card) or DPP (Dedicated Peripheral Port) port for smart-card reader.

For brevity, only the main elements which are relevant for the current invention are marked herein while the functions related to the KVM functionality of secure KVM system 300 will not be recited herein.

Secure KVM system 300 comprises secure KVM unit 305 connected to a plurality of host computers 10a to 10d on a first side, and on a second side to a user I/O devices such as a display, keyboard, mouse and audio headset. The KVM unit 305 further comprises an additional dedicated peripheral port 344 to enable connection of a pre-defined device such as smart-card reader 340 (seen in here with a smart card 304 inserted in it). The functionality of securing dedicated peripheral port 344 and selectively connecting it to the selected host from among hosts 10a to 10d is in dedicated peripheral port switching subsystem 399.

Secure KVM 305 is pre-programmed to accept only smart-card reader 340 in the peripheral port 344. An attempt to connect a different device or to switch peripheral devices connected to dedicated peripheral port 444 preferably disable that port and may initiate a tampering alert.

Inside secure KVM 305, dedicated peripheral port 344 is coupled to a switching circuitry 350 to enable selection between: (a) a qualification function 352 while peripheral device is being initially qualified (Peripheral Qualification Mode); and (b) a channel select switch function 356 while peripheral device is being used by the user (Peripheral Use Mode).

Qualification function 352 interacts with the connected peripheral device to determine if the device matches a set of pre-programmed qualification characteristics. For example the qualification function 352 can qualify the connected peripheral device based on: device class, device model, device vendor ID, device unique ID etc. Once a connected peripheral device 340 has passed the pre-programmed qualification process then qualification function 352 commands the switching circuitry 350 to switch to Peripheral Use Mode. In Peripheral Use Mode the peripheral device port 344 is routed to the channel select switch function 356 to select one host from attached hosts 10a to 10d.

In Peripheral Use Mode, peripheral port activity may be monitored by a continuous monitoring function 354 to continuously monitor peripheral device type and disconnect from KVM 305 and trigger the switching circuitry 350 back to qualification function if needed. Continuous monitoring function 354 may be implemented using a USB hub wherein hub LEDs outputs are sampled by qualification function 352 to detect peripheral device 340 disconnection. The use of a USB hub as the continuous monitoring function 354 reduces the risk that the user will first connect a proper device 340 and once it is qualified will switch to a different (unauthorized) device.

The channel select switch function 356 is coupled to four matching dedicated host peripheral ports 360a to 360d. Dedicated peripheral cables (not shown in this figure) connecting the dedicated peripheral ports 360a to 630d to hosts 10a to 10d respectively. Controller function 320 controls switch function 356 via command line 323 in response to user activation of push-buttons 319 or as stand-alone function.

Some exemplary embodiments of the current invention to be detailed below perform at least some of the functionality of dedicated peripheral port switching subsystem 399. Some exemplary embodiments of the current invention provide improved functionality of the dedicated peripheral port switching subsystem.

Some exemplary embodiments of the current invention provides the functionality of the dedicated peripheral port switching subsystem in a stand alone unit or in a unit integrated within a host computer.

Some exemplary embodiments of the current invention add functionality missing in the prior art devices, for example (and not limited to):

1. 1. Fixed dedicated peripheral filter—for example a USB security filter designed to enable only Human Interface Devices (HID Class USB).
2. Field updateable profiles used to allow or block connection of specific or classes of devices.
3. Sniffing and monitoring data exchanged between the connected device and the host.
4. Detection of disconnection or resetting the device as a way to prevent exchanging of an approved connected device with a fake, doctored, compromised or offending device.
5. Creating a table that maps the operational permissions of devices to specific ports as a way to create a flexible operational and security matrix (detailed in FIG. 11). In this way, devices permitted to connect to some host computers will be prevented from connecting to other host computers.
   a. The operational and security matrix may be updated.
   b. The operational and security matrix may comprise White list (approved devices) and black list (blocked devices)
   c. The operational and security matrix may be updated by capturing the profile of a connected device.

FIG. 2 schematically illustrates a high-level block diagram of a secure peripheral system 100 having a Secure USB Gateway device 11 according to an exemplary embodiment of the current invention, an unknown USB peripheral device 24 and a host computer 10. The secure peripheral system 100 enables connection of various USB devices while enforcing strong peripheral device security policy on the device 11 and Host computer 10 instead or in parallel to the security policy on host computer device 10.

This embodiment of the present invention is having a microcontroller function 32a that controls the device 11 operation. Microcontroller function 32a may be implemented using a standard microcontroller, discrete components state-machine, an ASIC, an FPGA or any other suitable technology that can run state machine code. Microcontroller function 32a may have a code protection through storage on Read Only Memory (ROM), on read or write protected flash, protected by fuses, stored on encrypted memory space or otherwise protected to prevent modification or reading by local or remote attacker.

USB peripheral device 24 is any user selected peripheral device that is attached to the Secure USB Gateway device 11 USB peripheral device port 18 through USB cable 22, and USB plug 4. Alternatively USB peripheral device 24 may be connected directly to the Secure USB Gateway device 11 peripheral device port 18 through a built-in USB plug 4 (for example a USB dongle or disk-on-key having a USB plug and no cable 22).

Inside the Secure USB Gateway device 11, USB lines 16x are coupling the USB peripheral device 24 to the optional USB enumeration and reset detector function 12 (as will be described later in the text).

USB lines 16dm and 16dp are coupling the USB peripheral device port 18, also referred to herein as USB port 18 and/or USB jack 18, to the mode select switch functions 9dm and 9dp (dm stands for Data Minus while dp stands for Data Plus in the following text). The mode select switch functions 9dm and 9dp are USB switches or multiplexers that are jointly controlled by the microcontroller function 32a through switch control line 13. In the following text we may refer to mode select switch functions 9x as a single element termed "mode select switch".

When USB peripheral device 24 is first connected to the Secure USB Gateway device 11 for the first time (or when device 11 is powered up with device 24 already connected), the microcontroller 32a commands the mode select switches 9dm and 9dp via line 13 to route the USB lines 16dm and 16dp to the microcontroller function 32a USB port through USB lines 6dm and 6db respectively. This routing allows the microcontroller function 32a to emulate a host PC USB stack and enumerate the connected USB peripheral device 24. This process is called here Device pre-qualification. Optionally, select switches 9dm and 9dp are configured to route the USB lines 16dm and 16dp to the microcontroller function 32a as a default, and require an active signal on line 13 to route the USB lines 16dm and 16dp to the USB plug 14. Thus, a malfunction, or defeat of the microcontroller function 32a would not create a bridge between USB peripheral device 24 to host 10. In normal operation, USB plug 14 (which may also be termed "host port") is connected to a host computer. Although the device seen in this figure is depicted as a box having a USB cable terminating with a USB plug 14 and a USB jack 18, it should be noted that this is but one way to construct the device. It may be in a form of a dongle inserted into a USB jack and having a USB jack or it may be permanently connected to the host 10. Thus, a USB cable exiting the device may be between the device and the host 10, the device and the USB device 24, on both sides of device, or missing altogether. The Device pre-qualification process assures that only allowed USB devices will be used with the Secure USB Gateway device 11.

USB plug 14 may be a standard USB 2 or USB 3 Type-A plug or a custom self-locking plug to secure the device 11 to the host computer 10.

Device 11 is further having an optional two port host USB hub 17 coupled to the host computer 10 to further enhance security. USB authentication token or security microcontroller 31 coupled to one downstream port of host USB hub 17 enables secure device 11 authentication. Such secure device 11 authentication may be used by centralized security management software to verify that device is connected and secured in needed locations.

Secure USB Gateway device 11 may have predefined profiles that are permanently or temporarily stored in a memory, for example a flash or ROM memory within microcontroller function 32a. These predefined profiles are being used during the Device pre-qualification process to compare with the connected USB peripheral device 24 profile in order to decide if it is qualified or not.

Device pre-qualification is making qualification decisions based on the following two options:
  a. If the connected USB peripheral device 24 does not match the predefined profile (it is not qualified) then the microcontroller 32a commands the USB mode select switches 9dm and 9dp via line 13 to remain in its initial position (as shown in FIG. 2) and thus isolate the device 24 USB signals from connected host computers 10.
  b. Only if the connected USB peripheral device 24 matches the predefined profile (it is qualified), then the microcontroller function 32a commands the USB mode select switches 9dm and 9dp to change its position to couple the device 24 USB signals 16dm and 16dp via USB lines 5dm and 5dp respectively, to the connected computer 10 USB port.

Device status indicator, for example bi-color LED 42 which is coupled to the microcontroller function 32a provides essential user indications about the connected USB peripheral device 24 qualification status.

User indications may be for example:
Off—no connected peripheral device 24
Steady green—device is qualified
Steady red—device is rejected (not qualified)
Blinking green—device is being enumerated DC power to the Secure USB Gateway device 11 is preferably supplied by the connected computer 10 USB port via USB plug 14 and 5vbus line and line 2. Optionally power is supplied by an external AC/DC power supply (not shown in this FIG. 2) that is coupled through DC or AC jack. Internal power to the Secure USB Gateway device 11 circuitry is supplied through line 2. Supplied DC voltage may be higher (or lower) than needed and internal DC to DC circuitry may be used to reduce the voltage to a lower level.

Same incoming DC voltage may also be supplied to the connected USB peripheral device 24 via line 16vbus, USB jack 18 and USB cable 22. Internal current limit circuitry may be added to protect the Secure USB Gateway circuitry from device 24 short-circuit or reverse power injection.

Although the device described here is relatively secure, there is still a possibility that the USB peripheral device 24 will bypass the qualification security process through one or more behaviors (deliberately or when the user is unaware):
  USB peripheral device 24 will enumerate once as one (qualified device) and in other times as another device (unqualified);
  USB peripheral device 24 will reset the USB link and re-enumerate as a different device; or The user will change USB peripheral device 24 during the brief time interval between device pre-qualification and computer 10 enumeration.

To protect from such events the following methods may be used by the Secure USB Gateway device:

1. Detection of USB jack 18 mechanical state, using a sensor such as a small switch (not seen in this figure) that is capable of detecting the disconnection of valid peripheral device 24 and reporting the disconnection to controller 32*a* or active anti-tampering function 38.
2. USB hub connected between device port 18 and USB mode select switch 9*dm* and 9*dp*. The USB hub reports any device status changes to the controller 32*a*.
3. USB peripheral device 24 current change sensing through shunt, amplifier and Analog to Digital converter. (as will be illustrated in next figures).
4. Optional USB enumeration and reset detector function 12 may be implemented using discrete circuitry, an ASIC a microcontroller, or FPGA device. USB enumeration and reset detector function 12 circuitry senses or sniff the USB lines 9*x* to detect changes in connection, re-enumeration or link reset states and to report these events to the microcontroller function 32*a*.
5. Optional USB enumeration and reset detector function 12 may be further be extended to enable qualification process. As opposed to prequalification process that described above, the USB enumeration and reset detector function 12 may detect the actual enumeration state of the connected USB peripheral device 24 while interacting with the computer 10. Similar to prequalification process, this captured data may be compared with the predefined profile to decide if device is qualified or not. In the case that device is not qualified; microcontroller function 32*a* may disconnect the USB peripheral device 24 from host by commanding USB switches 9*x* to revert to the original pre-qualification state.

Optional Programming port 44 is a USB device port to enable configuration loading from PC or similar computing device using a cable. Programming port 44 is coupled to the microcontroller function 32*a*. When configuration is being loaded from external device, microcontroller function 32*a* uses internal or external non-volatile memory such as flash to store the required configuration parameters. Same (or a separate) non-volatile memory also may be used to store a log of events for later auditing.

Programming port 44 is a USB device port and may be further extended to enable real-time capture of connected USB peripheral device 24 enumeration parameters. These captured parameters may be later used to add the captured device to the white-list or to the black-list as needed.

Alternatively, field programming of Secure USB Gateway device 11 may be done through the same USB port 18 that normally used for USB device. Note that preferably case device 11 may not be programmed by the connected host 10 to prevent security attacks by the connected host in case that it is infected with a malicious code. Other methods may be used for minimize venerability to malicious reprogramming such as using passwords, encryption of the data, enabling reprogramming only by connecting a dedicated reprogramming device, and temporary or permanent disabling of the device if repeated failed attempts are made for reprogramming. These measures may be employed by other embodiments to be detailed later.

Optionally, port 44 is used for continues real-time monitoring of the activity of the secure gateway device. For example port 44 of one, or a plurality of gateway devices, may be interfaced with a security and monitoring network that receives activity logs and alert messages from the gateway devices. Optionally, a security server connected to ports 44 is used for monitoring the activity logs and alert messages from the gateway devices. Optionally, on detecting abnormal activity, the security server can perform at least one of: deactivate the gateway, block the suspicious communication, and alert system administrator.

To enable higher security operation with certain devices, it is sometime desirable to limit the time that they are operating. For example a webcam or microphone may cause security vulnerabilities if allowed to operate continuously. Secure USB Gateway device 11 may be fitted with a special timing function that is operating as follow:

1) Normally the USB peripheral device 24 is being isolated through the USB model select switches 9*x*.
2) When the user pushes the illuminated pushbutton 33, the USB peripheral device 24 is being connected to the host 10; the illuminated switch 33 is being illuminated to provide clear user indications and the timer function start counting.
3) After pre-programmed time interval the illuminating is turned off and the USB peripheral device 24 is being isolated again.
4) Additional illuminated push-button 34 enable the user to disable the USB device at any time.
5) During the time that the peripheral device 24 is connected, the user may press the push-button 33 again to extend the time interval by another cycle time.

In an embodiment of the present invention the Secure USB Gateway device 11 is optionally further equipped with active anti-tampering function 38. This function uses low power microcontroller or discrete components to sense mechanical intrusion attempt through sensor such as switch 40 that is coupled to the device enclosure. When switch 40 is interrupted, the anti-tampering function 38 senses this transition and triggers a chain of events through line 30 that cause the following effects:

a. Device 11 is disabled permanently—it cannot be used anymore.
b. Device provides clear user indications of the tampered state. These indications typically include blinking action of the red lighted LEDs inside the pushbutton switch 33.

During normal operation, microcontroller function 32*a* and anti-tampering function 38 are powered by the external DC power supply via DC jack or from connected computer 10 via supply line 2.

Coin battery or super-capacitor 36 provides backup power for the anti-tampering function 38 and sensor 40 to enable detection even when the device is unpowered (for example during shipment). Additional means such as tamper evident labels (tamper evidence label 99 seen in FIG. 9), may be used to provide visual indications of the tampering attempt.

It should be noted that the active anti-tampering function may be critical to assure that product was not tampered with, modified, or extra circuitry added to it to provide a covert activation of peripheral device 24, or to add other covert monitoring such as eavesdropping audio channel with remote attacker.

It should be noted here that in this FIG. 2 and in the next figures USB 1.1 or 2.0 signals are shown (dm and dp). This is done to prevent cluttering. It is easy to scale the block diagram to handle the additional signals required to support more advanced protocols such as USB 3.0 having 4 lines for example (SSRX+, SSRX−, SSTX+, SSTX−). Other serial protocols such as Thunderbolt and Firewire may also be used. It should be noted that the terms "USB"; "USB port", "USB controller", etc. are used here as exemplary protocols, and other protocols and their associated connectors, communication channels, emulators and/or other logical and hardware components may take their place.

Figure 2A:
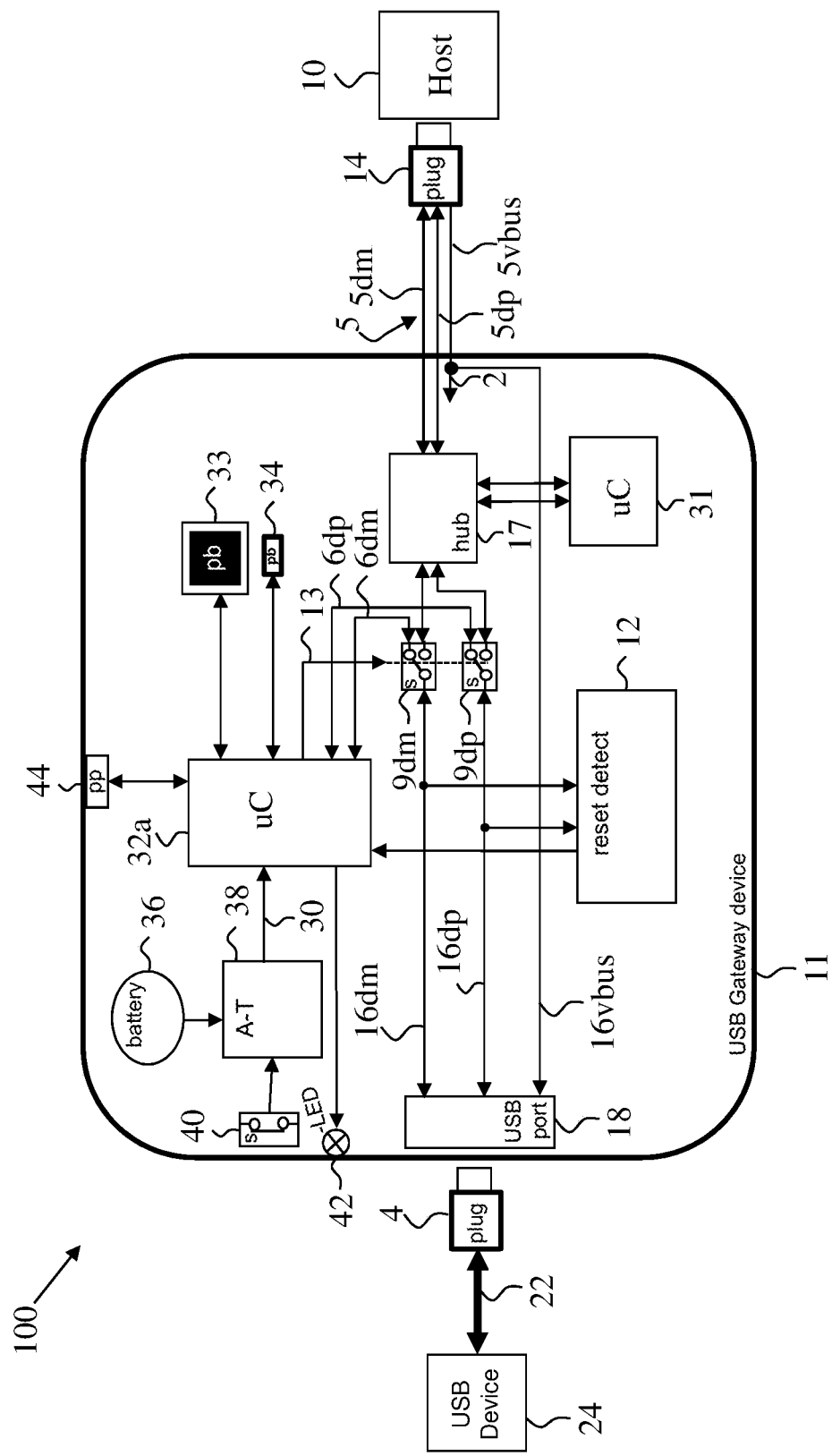
FIG. 2A Schematically illustrates a high-level block diagram of a Secure USB Gateway device according to an exemplary embodiment of the current invention having a USB prequalification function and one USB host port.
Figure 2B:
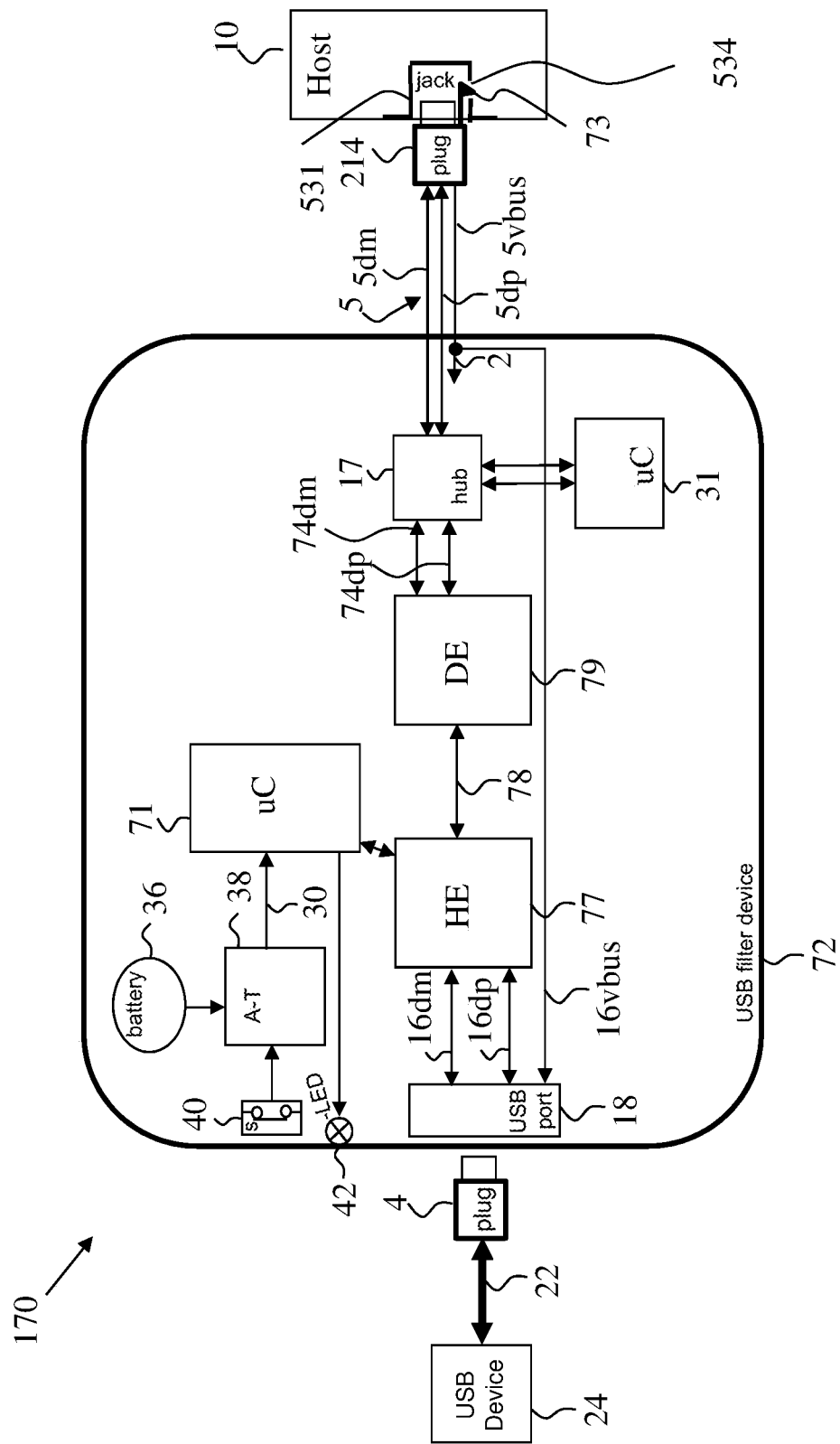
FIG. 2B Schematically illustrates a high-level block diagram of a Secure USB filter device according to an exemplary embodiment of the current.

FIG. 2B Schematically illustrates a high-level block diagram 170 of a Secure USB filter device 72 according to an exemplary embodiment of the current.

USB filter device 72 is "natural USB filter" that uses Host emulator (HE) 77 and Device emulator (DE) 79 connected together in series between USB jack 18 and USB connector, for example modified USB plug 214.

Modified USB plug 214 optionally equipped with one or more "one-time" locking teeth 73 that are designed to engage with shielding tab holes 534 inside standard USB jack 531, locking the modified USB plug 214 to the USB jack 531 to prevent its advertent, malicious, or inadvertent removal.

Optionally a "data diode" may be inserted between HE 77 DE 79, in line with communication channel 78, enforcing unidirectional data flow only in one predetermined direction bi-directional communication is allowed between HE 77 DE) 79.

Exemplary embodiments of this setup are usable to filter for example keyboard and mouse and other user interface devices. Since keyboard and mouse covers about 80% of the commercial need for filters, a non-programmable is very cost effective solution.

In this example, channel 78 is unidirectional link that transfers the key strokes and mouse commands from HE 77 to DE 79. Optionally channel 78 is a bi-directional link capable also of passing data in the other direction (from DE 79 to HE 77) to support functions such as Caps lock and Num lock LEDs.

It should be noted that while USB filter device 72 of FIG. 2B was depicted as a box at the end of a USB cable, similar device can be prepared in a form of a USB dongle.

Optional microcontroller function 71 is the management and security function.

Exemplary embodiments of this setup are usable to filter for example keyboard and mouse and other user interface devices. Since keyboard and mouse covers about 80% of the commercial need for filters, a non-programmable is very cost effective solution.

In this example, channel 78 is unidirectional link that transfers the key strokes and mouse commands from HE 77 to DE 79. Optionally channel 78 is a bi-directional link capable also of passing data in the other direction (from DE 79 to HE 77) to support functions such as Caps lock and Num lock LEDs.

It should be noted that optionally, USB filter devices 72 may be prepared and sold to be used with USB classes other than keyboard and mouse as USB devices 24. For example: USB audio devices, USB camera, Printer, etc. The characteristics of the class (or a limited number of classes) of USB devices that are capable to interface with host 10 via filter 72 may be programmed into one or few of: DE 79, security microcontroller 31, and uC 71.

Optionally Secure USB filter device 72 is not programmable and cannot be modified by the end user. Optionally, once a Secure USB filter device 72 is inserted into one of the USB jacks of host 10 is not to be removed, and that USB jack becomes dedicated to be used with the designated class of USB devices recognized by the inserted filter.

Anti-tampering functionality already discloses in FIG. 2A (30, 36, 38, 40) is optional. Additionally or alternatively Tamper Evident Labels may be used.

Figure 3A:
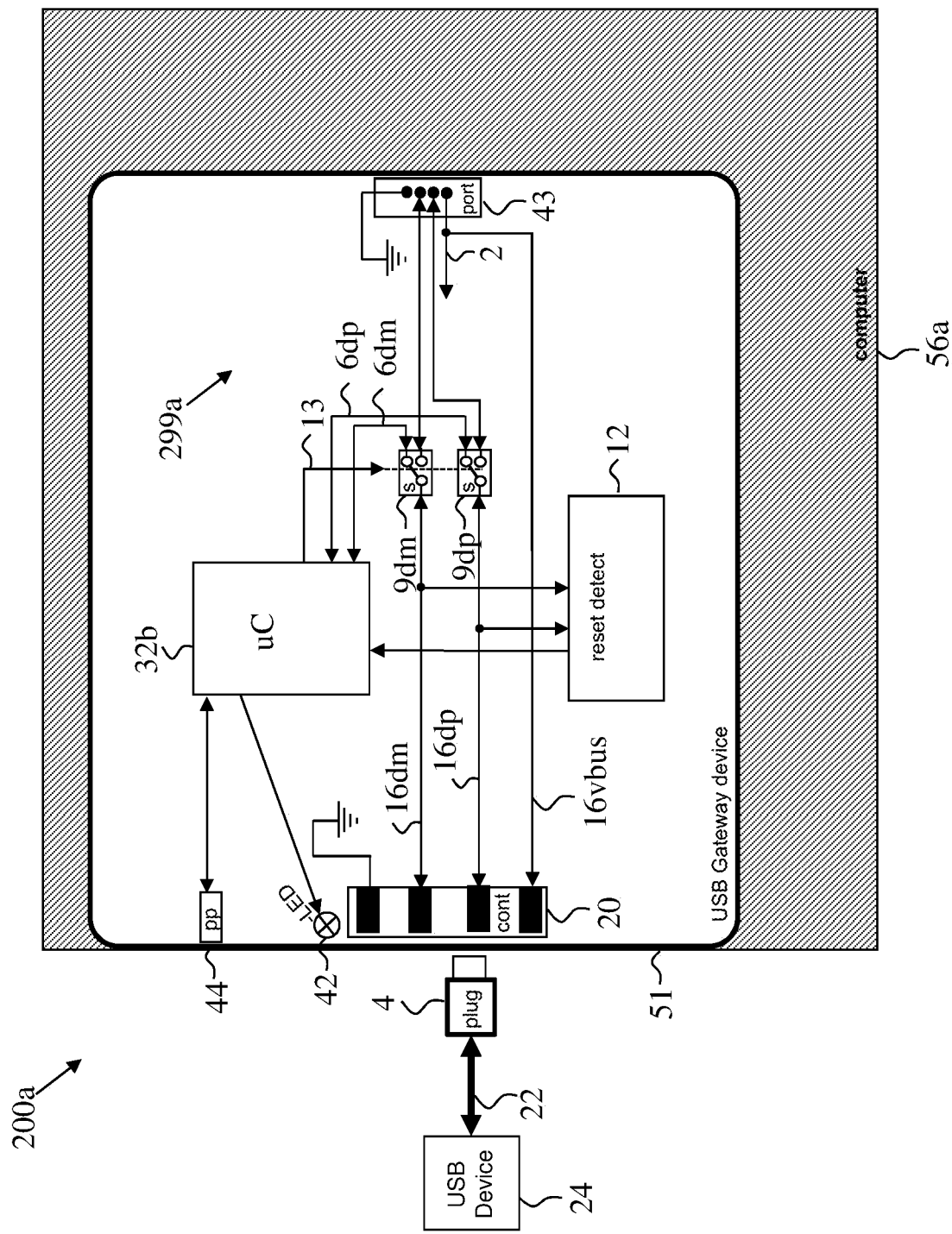
FIG. 3A schematically illustrates a high-level block diagram of yet another Secure USB Gateway device built inside a USB jack and having one USB device port and one USB host port according to an exemplary embodiment of the current invention.

FIG. 3A schematically illustrates a high-level block diagram of another Secure USB Gateway device 51 showing the electronic circuitry 299a according to an exemplary embodiment of the current invention. This embodiment for the current invention is similar to the one illustrated in FIG. 2 above but it is embedded inside a USB jack miniature enclosure. This exemplary embodiment of the current invention is having one USB device port through USB contacts 20 and one USB host port 43 implemented as soldered pins that fits the standard USB jack footprint.

The Secure USB Gateway device 51 is designed to be soldered on a computer, server or similar platform motherboard 56a instead of a standard USB jack to enhance system security. It may be implemented as a single USB 2.0, USB 3.0 or other protocol jack or it can be implemented as multiple (stacked) jacks as will be shown in the next two figures.

System 200a thus comprises the USB device 24, the Secure USB Gateway device 51, and a host represented by motherboard 56a. It should be noted that the term "motherboard" should be viewed as non-limiting and may stand for a board within the enclosure of the host. Optionally a cable or a flat cable or a connector connects the Secure USB Gateway device 51 to the motherboard of the host.

This exemplary embodiment of the current invention may have anti-tampering means similar to the means illustrated in FIG. 2 above but typically due to the size limitations some of these means are not incorporated here. For example, switch 40, anti-tampering function 38 and battery 38 may be missing. Disconnection, deactivation or reset of device 24, or removal of USB plug 4 may be detected by USB enumeration and reset detector function 12 or by monitoring the current drawn by device 24 or by sensing the pull up resistors to 3.3V on the USB device data lines.

Optional device status LED 42 may be located near the USB contacts 20 to provide proper visible user indications. Alternatively Device status LED 42 may be located elsewhere and a plastic transparent light-pipe may be used to transfer the light to the contacts side of the jack.

Field programming of Secure USB Gateway device 51 may be done through a dedicated programming port 44 or through the same USB contacts 20 that normally used for USB device. Preferably, device 51 may not be programmed by the connected platform via USB port 43 to prevent security attacks by the connected host in case that it is infected with a malicious code. Other methods may be used for minimize venerability to malicious reprogramming such as using passwords, encryption of the data, enabling reprogramming only by connecting a dedicated reprogramming device, and temporary or permanent disabling of the device if repeated failed attempts are made for reprogramming. These measures may be employed by other embodiments to be detailed later.

Programming port 44 may additionally or alternatively be used as an out-of-band management port to connect one or more Secure USB Gateway device 51x into a management function that enables centralized management (local or remote), asset management, events log, alarms etc.

Figure 3B:
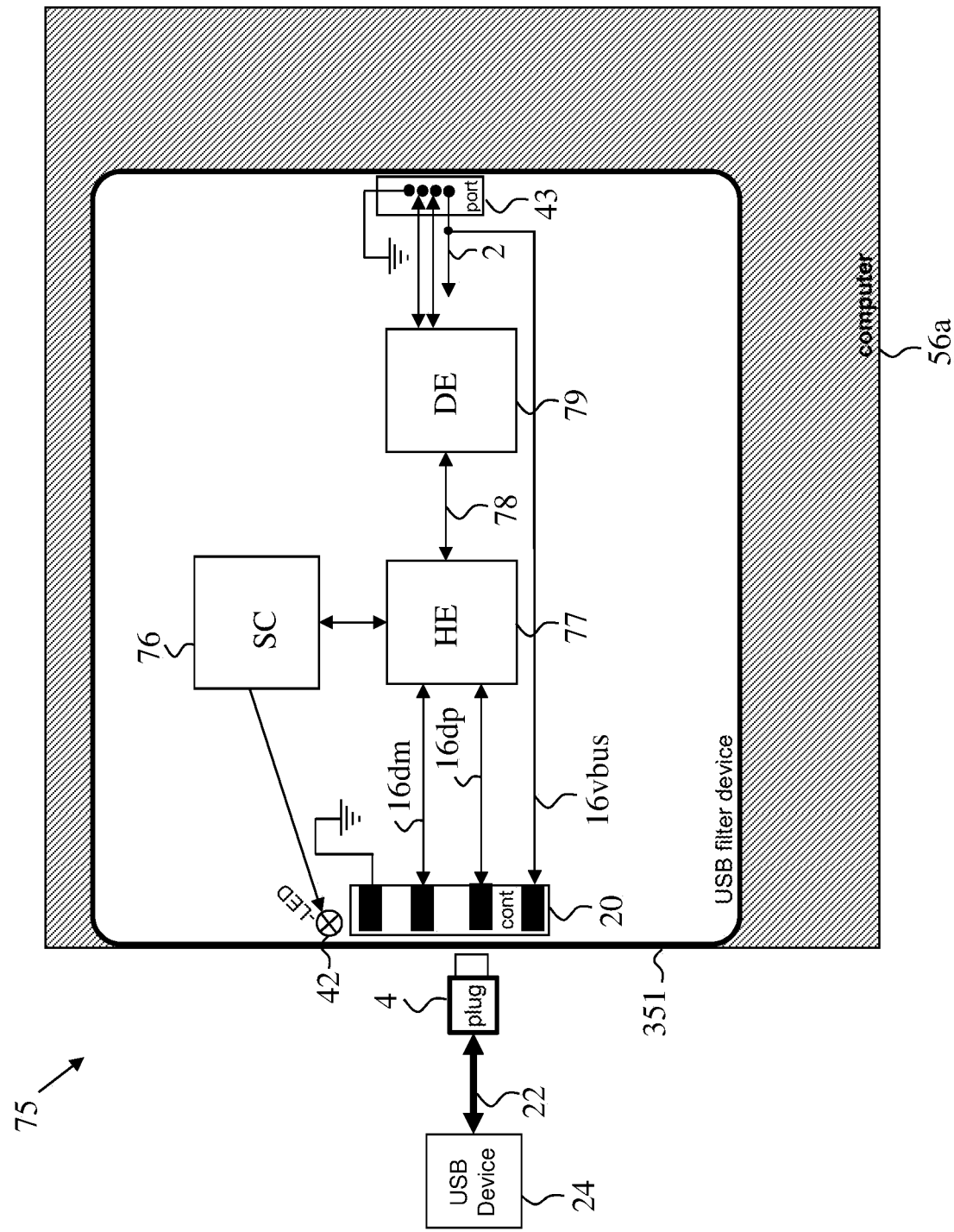
FIG. 3B schematically illustrates a high-level block diagram of USB filter device according to an exemplary embodiment of the current invention.

FIG. 3B schematically illustrates a high-level block diagram of USB filter device 351 showing the electronic circuitry 75 according to an exemplary embodiment of the current invention.

USB filter device 351 is "natural USB filter" that uses Host emulator (HE) 77 and Device emulator (DE) 79 connected together in series between USB jack 20 and USB port 43, Optionally a "data diode" may be inserted between HE 77 DE 79, in line with communication channel 78, enforcing unidirectional data flow only in one predetermined direction bi-directional communication is allowed between HE 77 DE) 79.

Exemplary embodiments of this setup are usable to filter for example keyboard and mouse and other user interface devices. Since keyboard and mouse covers about 80% of the commercial need for filters, a non-programmable is very cost effective solution.

In this example, channel 78 is unidirectional link that transfers the key strokes and mouse commands from HE 77 to DE 79. Optionally channel 78 is a bi-directional link capable also of passing data in the other direction (from DE 79 to HE 77) to support functions such as Caps lock and Num lock LEDs.

It should be noted that while USB filter device 351 of FIG. 3B was depicted as a device internal to the host (soldered or connected to motherboard 56*a*) a similar device can be prepared for external use.

Optional System Controller (SC) 76 is the management function which may be integrated with HE 77 or completely omitted. Similarly, Device status indicator, for example one-color or bi-color LED 42 is optional.

Figure 4:
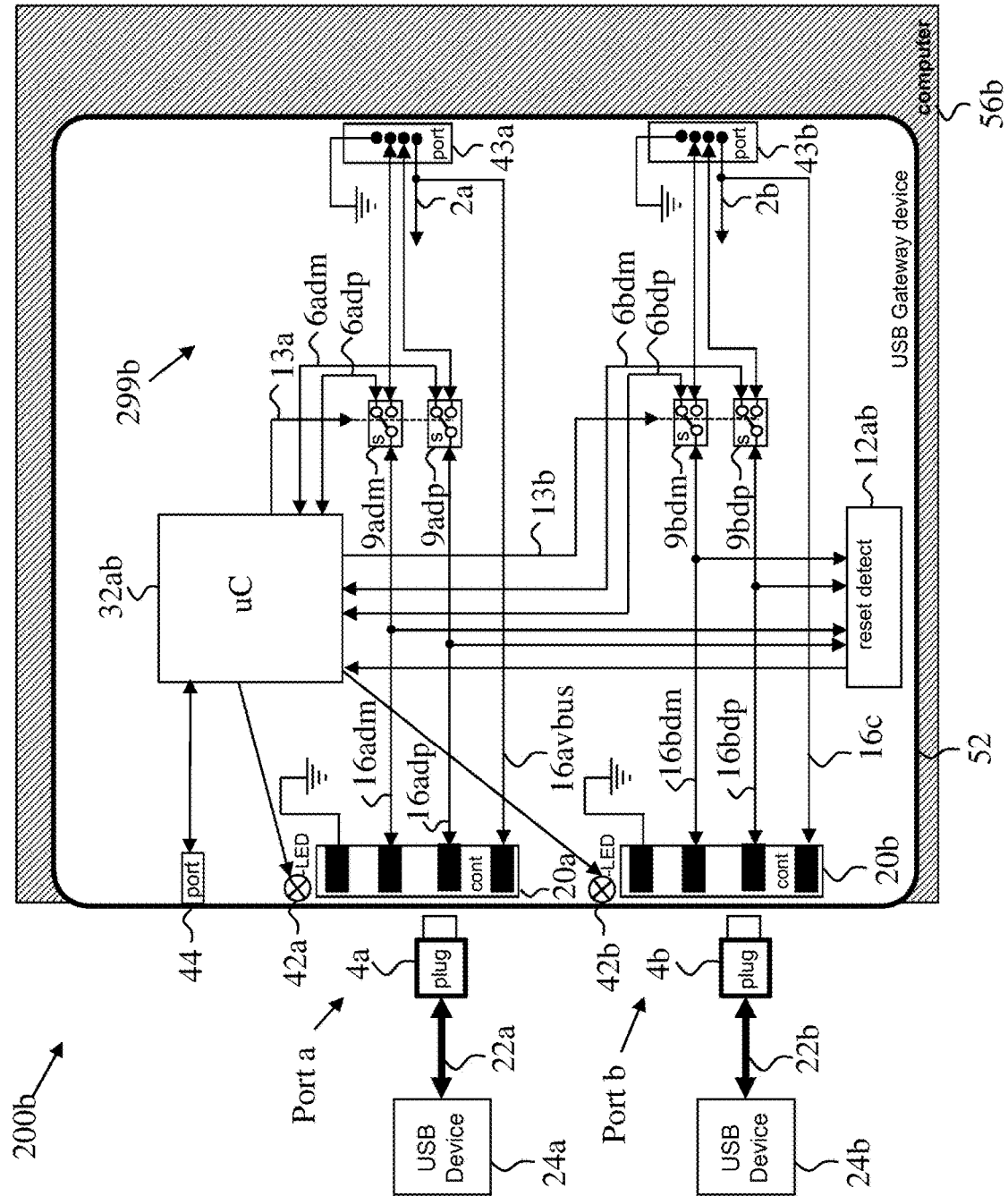
FIG. 4 schematically illustrates a high-level block diagram of yet another Secure USB Gateway device according to an exemplary embodiment of the current invention. This embodiment for the current invention is built inside a stacked USB jack and having two USB device ports and two USB host ports.

FIG. 4 schematically illustrates a high-level block diagram of yet another Secure USB Gateway device 52 showing the electronic circuitry 299*b* according to an exemplary embodiment of the current invention. This embodiment for the current invention is similar to the one illustrated in FIG. 3 above but it is built inside a dual stacked USB jack miniature enclosure. This exemplary embodiment of the current invention is having two USB device ports through USB contacts 20*a*, 20*b* and two USB host ports 43*a* and 43*b* implemented as soldered pins that fits the standard USB jack footprint.

The Secure USB Gateway device 52 is designed to be soldered on a computer, server or similar platform motherboard 56*b* instead of a standard stacked USB jack to enhance system security. It may be implemented as a single USB 2.0, USB 3.0 or other protocol jack.

This exemplary embodiment of the current invention enables cost and size reduction by sharing some of the functions for the two ports (port or channel A and port or channel B), for example:

Microcontroller function 32*ab* may be shared between the two ports.

Microcontroller function 32*ab* controls channel A USB switches 9*adm* and 9*adp* via line 13*a* and also control channel B USB switches 9*bdm* and 9*bdp* via line 13*b*.

Programming/Out-of-Band management port 44*ab* may be shared between the two ports.

Optional USB enumeration and reset detector function 12*ab* may be implemented using discrete circuitry, an ASIC a microcontroller, or FPGA device. This circuitry senses or sniff the USB channel A lines 16*adm*, 16*adp* and channel B lines 16*bdm* and 16*bdp* to detect changes in connection, re-enumeration or link reset states and to report these events to the microcontroller function 32*ab*.

Channel A user indications provided by bi-color LED 42*a* while Channel B user indications provided by bi-color LED 42*b*.

Figure 5:
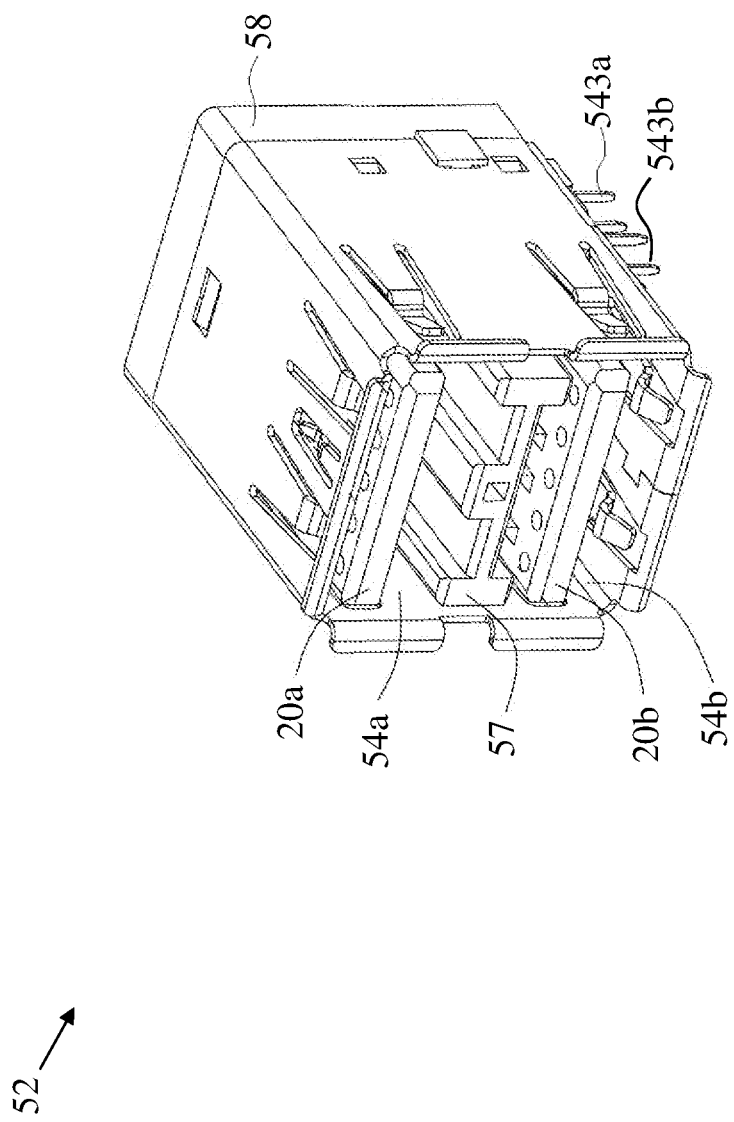
FIG. 5 illustrates the external view of a Secure USB Gateway device according to an exemplary embodiment of the current invention illustrated in FIG. 4 above. Such device may be soldered on the Printed Circuit Board of devices such as computers, servers, tablets and docking stations to provide higher security to its peripheral ports.

A typical mechanical layout of such stacked USB 3.0 jack is shown in the next FIG. 5.

System 200*b* thus comprises the USB device(s) 24*x*, the Secure USB Gateway device 52, and a host represented by motherboard 56*b*. It should be noted that the term "motherboard" should be viewed as non-limiting and may stand for a board within the enclosure of the host. Optionally a cable or a flat cable or a connector connects the Secure USB Gateway device 52 to the motherboard of the host.

FIG. 5 illustrates the external view of a Secure USB Gateway device 52 according to an exemplary embodiment of the current invention illustrated in FIG. 4 above.

In this figure the mechanical design of the Secure USB Gateway device 52 can be further explained. USB port A is formed from USB contacts 20*a* and metal sheet walls 54*a*.

USB port B is formed from USB contacts 20*b* and metal sheet walls 54*b*. Port A and port B are separated by separator 57.

The particular type of jack illustrated in this example non-limiting embodiment is USB 3.0 type with backwards compatibility to USB 1.1 and 2.0 jacks.

The electronic circuitry seen in FIG. 4 is housed inside metal sheet cover 58 at the rear side of the jack to enable using this jack as a direct replacement for standard stacked USB jacks. Optionally, the only deviation from the standard USB jack form factor is the additional space added under metal cover 58 for the electronics circuitry 299*b*, for example in the form of a small printed circuit. Additionally or alternatively, the electronics, for example in the form of a small printed circuit is housed above or below jack 52.

USB host ports 43*a* and 43*b* implemented as soldered pins 543*x* (only two are marked) that fits the standard USB jack footprint. Optional additional ground (shield) pins at the bottom side of the jack provides electrical grounding and mechanical strength.

Optionally, user indications LEDs 42*a* and 42*b* are located inside the metal sheet cover 58 and plastic light pipes (not visible in this figure) optically coupling these LEDs to the other side of the jack near USB contacts 20*a* and 20*b*.

The Secure USB Gateway device 52 according to an exemplary embodiment of the current invention illustrated in this FIG. 5 is soldered down to the computer, server or similar platform Printed Circuit Board and therefore it cannot be easily removed or bypassed by a user or an attacker.

To further enhance device security, Secure USB Gateway device 52 may also be associated with a strong authentication device that allows strong authentication over USB lines for local or remote security management platform. Such strong authentication may be based on long passwords, biometric parameters that are difficult to fake such as fingerprint or retinal image, other robust authentication methods known in the art or their combinations.

FIG. 6 schematically illustrates a high-level block diagram of a 4-port Secure USB Gateway device 46 according to an exemplary embodiment of the current invention having a USB prequalification function and four USB ports switching function. It should be noted that more or less USB ports may be incorporated in such device. The Secure USB Gateway device 46 is further coupled to four host computers 10*a* to 10*d* to enable controlled and secure use of a single USB peripheral device 24 by the four host computers.

The Secure USB Gateway device 46 is similar to the Secure Gateway device shown in FIG. 2 above with few differences that enables the user to switch the single USB peripheral device 24 to a selected one of four host computers 10*x*.

USB port select switch or multiplexer 19 couples the USB signals 21 to one of the plurality connected host computers 10*x* (four such hosts are seen in the exemplary embodiment depicted in this figure, but more or less than four may be used) based on channel select lines 41 derived by the microcontroller function 32*d*.

User channel selector, for example channel select push-buttons 35*a* to 35*d* coupled to the microcontroller function 32*d*, enables user selection of one of the coupled host computers 10*a* to 10*d* to interact with the USB peripheral device 24. When the user pushes the appropriate push-button 35*x* (herein, "x" stands for one of "a", "b", "c", or "d"), the microcontroller function 32*d* checks if the connected peripheral device 24 is allowed to connect to that specific host 10*x*. If it is allowed, than:

a. Microcontroller function 32*d* switches (via command line 13) the USB mode select switch 9 to pass USB signals through lines 21; and b. It switches the USB port select switch or multiplexer 19 to the desired channel through the channel select lines 41.

c. The word allowed here means that the specific peripheral device 24 appears in the list of allowed device profiles that are capable of connecting to the selected host computer channel 10*x*. Such list may be pre-programmed by the user or administrator together with the device white-list and black list. Additional device specific parameters may be pre-programmed for example if device is read only or write only at specific channel.

If the connected peripheral device 24 is not allowed to connect to that specific host 10*x*, than:

a. Microcontroller function 32*d* switches (via command line 13) the USB mode select switch 9 not pass USB signals through lines 21; or b. Microcontroller function 32*d* does not switches the USB port select switch or multiplexer 19 to the desired channel through the channel select lines 41 such that connected peripheral device 24 stays connected to the previously connected host; or c. Microcontroller function 32*d* switches the USB port select switch or multiplexer 19 to a idle channel (not seen in this figure) through the channel select lines 41 such that connected peripheral device 24 is not connected to any host; or d. A combination of the above.

It should be noted that Channel select push-buttons 35*a* to 35*d* preferably have internal illumination through LEDs to provide clear user indications of selected channel. For example if the user pushes push-button 35*b*, the LED inside or associated with that push button will be illuminated to indicate that this channel is selected. Alternatively, other user indications, for example LED 96*x*, each associated with the corresponding of push-buttons 35*x* (seen in FIG. 9) may be used. Alternatively, a display (not seen in these figures) may be used to indicate selected channel and other status information.

DC power to the Secure USB Gateway device 46 is optionally supplied by an external AC/DC power supply (not shown in this FIG. 6) that is coupled through DC jack 25. Internal power to the Secure USB Gateway device 46 circuitry is internally supplied through line 2. Supplied DC voltage may be higher (or lower) than needed and internal DC to DC circuitry may be used to reduce the voltage to a lower level.

Same incoming DC voltage is also supplied to the connected USB peripheral device 24 via shunt resistor 26 located between lines 15*a* and 15*b* (in series to the supply line).

Shunt 26 is coupled to an amplifier 27 that in turn coupled to an analog to digital converter 28 to enable accurate current consumption measurement. This current measurement digital line 29 is coupled to the microcontroller function 32*d* to enable further profiling and qualification of the connected USB device based on current consumption.

Programming port 44 is a USB device port to enable configuration loading from PC or similar computing device using a cable. Programming port 44 is coupled to the microcontroller function 32*d*. When configuration is being loaded from external device, microcontroller function 32*d* uses coupled flash memory device 45 as a non-volatile memory to store the configuration.

Flash memory device 45 is also being used to store a log of events for later auditing.

Desktop Controller Unit (DCU) port 55 enables Secure USB Gateway device 46 remote control and monitoring. This port 55 is coupled to the microcontroller function 32*d* and it uses a serial protocol to enable remote PC to send commands and receive status as needed. DCU 93 (seen in FIG. 7) is connected to port 55 with a cable 90. The connection of a DCU to the Secure USB Gateway device 46 may disable the device front panel push-buttons 35*x* to prevent ambiguous control inputs from both the DCU and the push-buttons.

Optional security bracket 49 may be fitted at the rear panel of the security device 46 to prevent users from removing USB cables 5*x*. Such metal bracket 49 is designed to prevent the removal of the rear panel USB jacks coupling the cables 5*x* to the device 46 enclosure. To further enhance the device security, special screws 50*a* and 50*b* are used to secure the security bracket 49. These screws are having a special head that requires a special tool for removal. In addition, one or more of these screws or metal pin is also coupled to an internal security switch 48 that in turn is coupled to the microcontroller function 32*d*. An unauthorized attempt to remove the security bracket 49 will trigger the switch 48 that may cause the device 46 to enter tampering state. Additionally or alternatively lock may be used for locking security bracket 49.

To further enhance the system security sometimes it is desirable to secure the USB plugs 23*x* to the host computers 10*x*. Special USB eLock plugs 23*x* may be used to lock the plugs inside their jacks. In order to release these eLock plugs electronically, microcontroller function 32*d*, is coupled to eLocks control function 66. The eLocks control function 66 receives eLock open commands from the microcontroller 32*d* and power the respective line 7*x* to unlock the respective eLock located in USB plug 4*x*. Such eLock opening command may be generated by the user having proper credentials using the coupled programmer 92 through programming port 44.

Programmer 92 (seen in FIG. 7) may be a PC or a laptop or other type of computer is connected to port 44 with a cable 91. Alternatively, programmer 92 may be a proprietary device, for example a device dedicated for programming Secure USB Gateway device 46.

Note: USB eLocks are security plugs having internal solenoid that locks the plug into the jack. Only when the solenoid is powered, the lock is being released and the user may pull the plug from the jack.

Optionally, Secure USB Gateway device 46 is equipped with a Lock push-button function. In this case, it is possible to lock the device 46 to a specific channel preventing the user from accidentally switching the device to a different channel.

Figure 9:
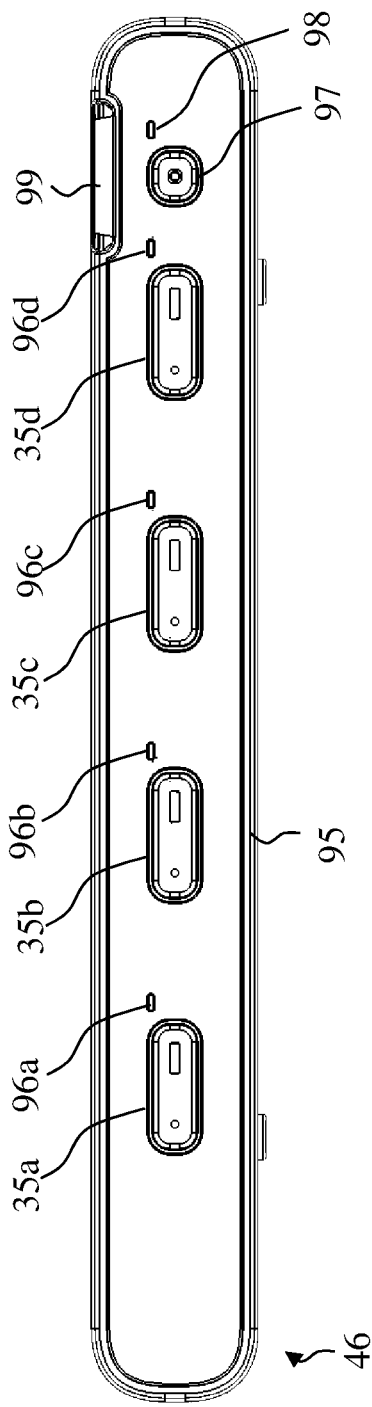
FIG. 9 Schematically illustrates a front view of a Secure USB Gateway device according to an exemplary embodiment of the current invention FIG. 10 schematically illustrates a back view of a Secure USB Gateway device according to an exemplary embodiment of the current invention.

Lock is activated by the user pressing the Lock push-button 97 on the front panel 95 (seen in FIG. 9). The operation will supersede pressing the channel buttons or the use of DCU. To exit Lock mode, the user presses the Lock push-button again. Lock indicator 98 is used for indication of Lock mode status.

Optionally, Lock indicator 98 is used to provide indication that DCU 93 (seen in FIG. 7) is in use.

System 500 thus comprises the USB peripheral device 24, the Secure USB Gateway device 46, and a plurality of host computers 10*x*.

The optional USB enumeration and reset detector function 12*a* may sniff and filter information exchanged between USB peripheral device 24 and the connected host 10*x*. For example, depending on communication limits, reset detector function 12*a* may allow information flow in one direction only, for example only from USB peripheral device 24 to connected host 10*x*, or only to USB peripheral device 24 from the connected host 10*x*. These communication limits (as will be detailed below in FIG. 11), are reported to reset detector function 12*a* by microcontroller 32*d* via channel 39. Channel 39 may also be used by reset detector function 12*a* to report to microcontroller 32*d* of a reset or disconnect of USB peripheral device 24 which in response may command USB mode select switch 9 to pass USB signals through lines 13 to microcontroller 32*d* for re-enumeration. Depending on the type of USB peripheral device 24 and the specific host 10*x*, microcontroller 32*d* may command reset detector function 12 to prevent certain type of data from passing to or from host 10*x*, or to allow only certain type of data to pass to or from host 10*x*. Optionally, reset detector function 12*a* may be positioned between USB mode select switch 9 and USB port select switch 19.

Figure 7:
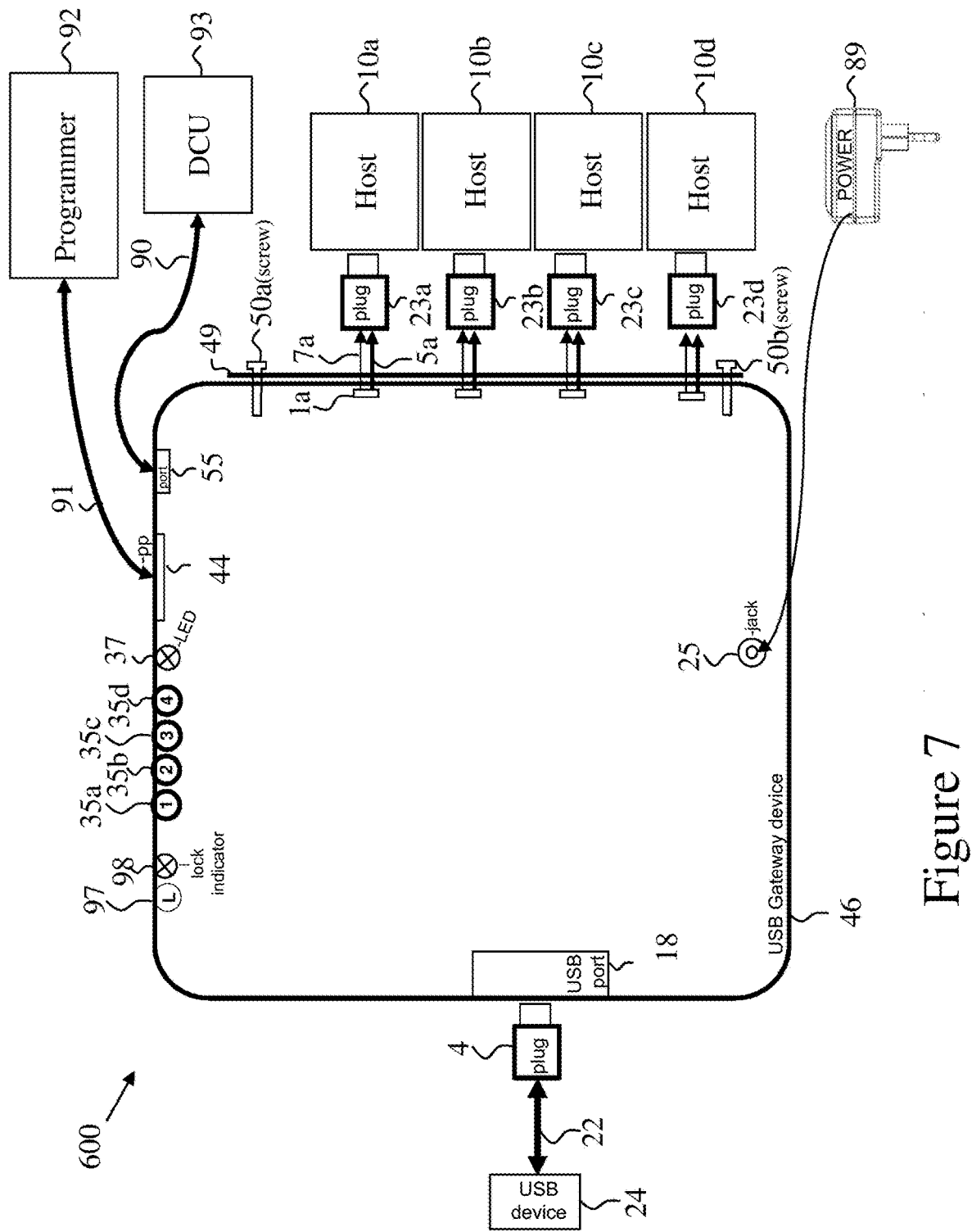
FIG. 7 schematically illustrates a high-level block diagram of a system using a Secure USB Gateway device 46 according to an exemplary embodiment of the current invention.

FIG. 7 schematically illustrates a high-level block diagram of a system 600 using a Secure USB Gateway device 46 (identical or similar to the device shown in FIG. 6 above) according to an exemplary embodiment of the current invention.

This figure shows the external power supply 89, the programmer 92 and the DCU 93 connected to the Secure USB Gateway device 46. It should be noted that in normal operation, programmer 92 is generally not present as it is used for setting up or changing the settings of device 46, and DCU 93 is only optionally connected. Additionally, not all hosts 10*x* have to be connected. For drawing clarity, some elements of device 46 were omitted or unmarked.

Figure 8:
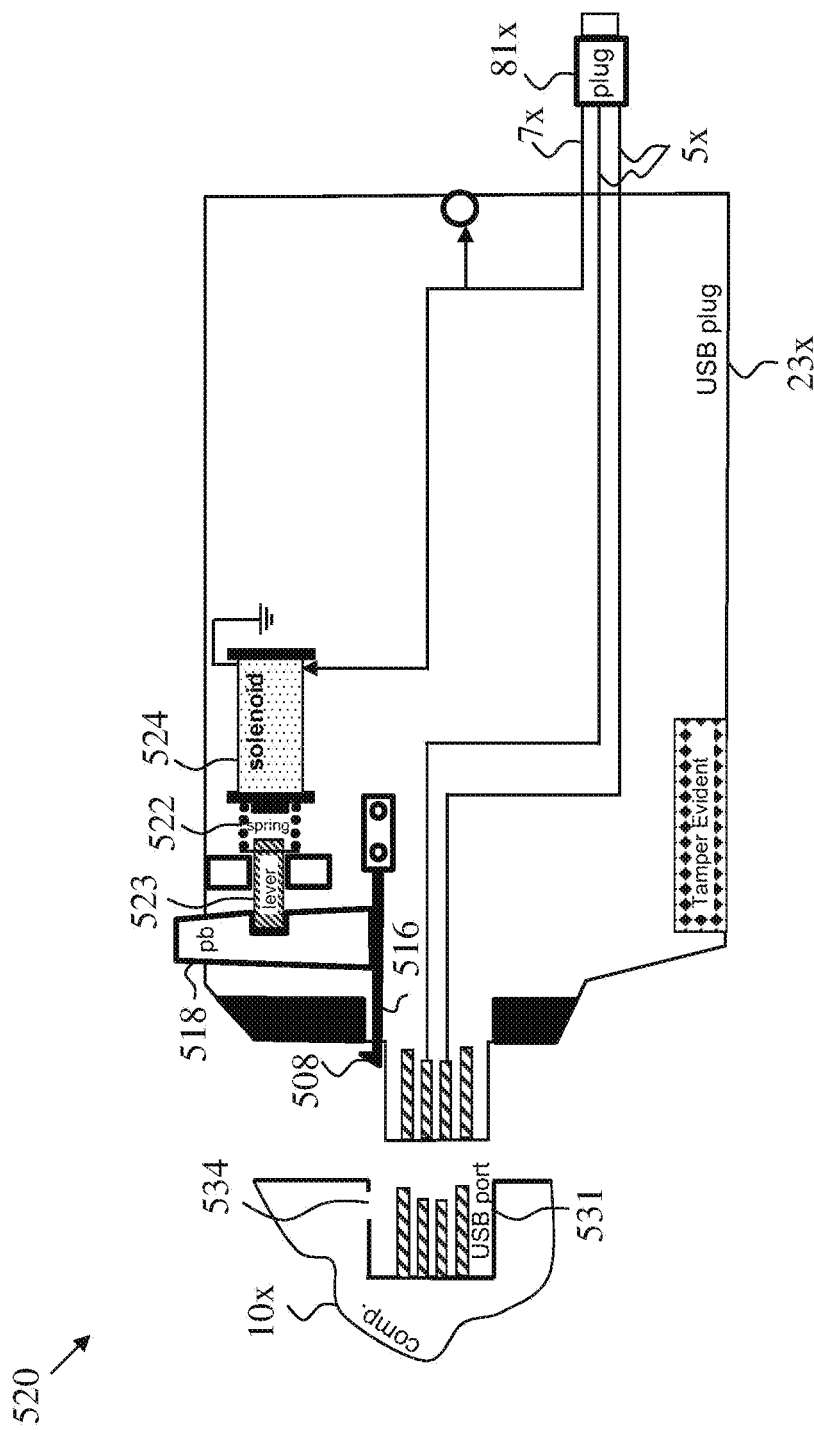
FIG. 8 Is adopted from FIG. 12 of a co-pending application Ser. No. 13/937,581 titled "Electro-Mechanic USB Locking Device" to the same inventor illustrates a high-level block-diagram of a USB cable locking device.
Figure 12:
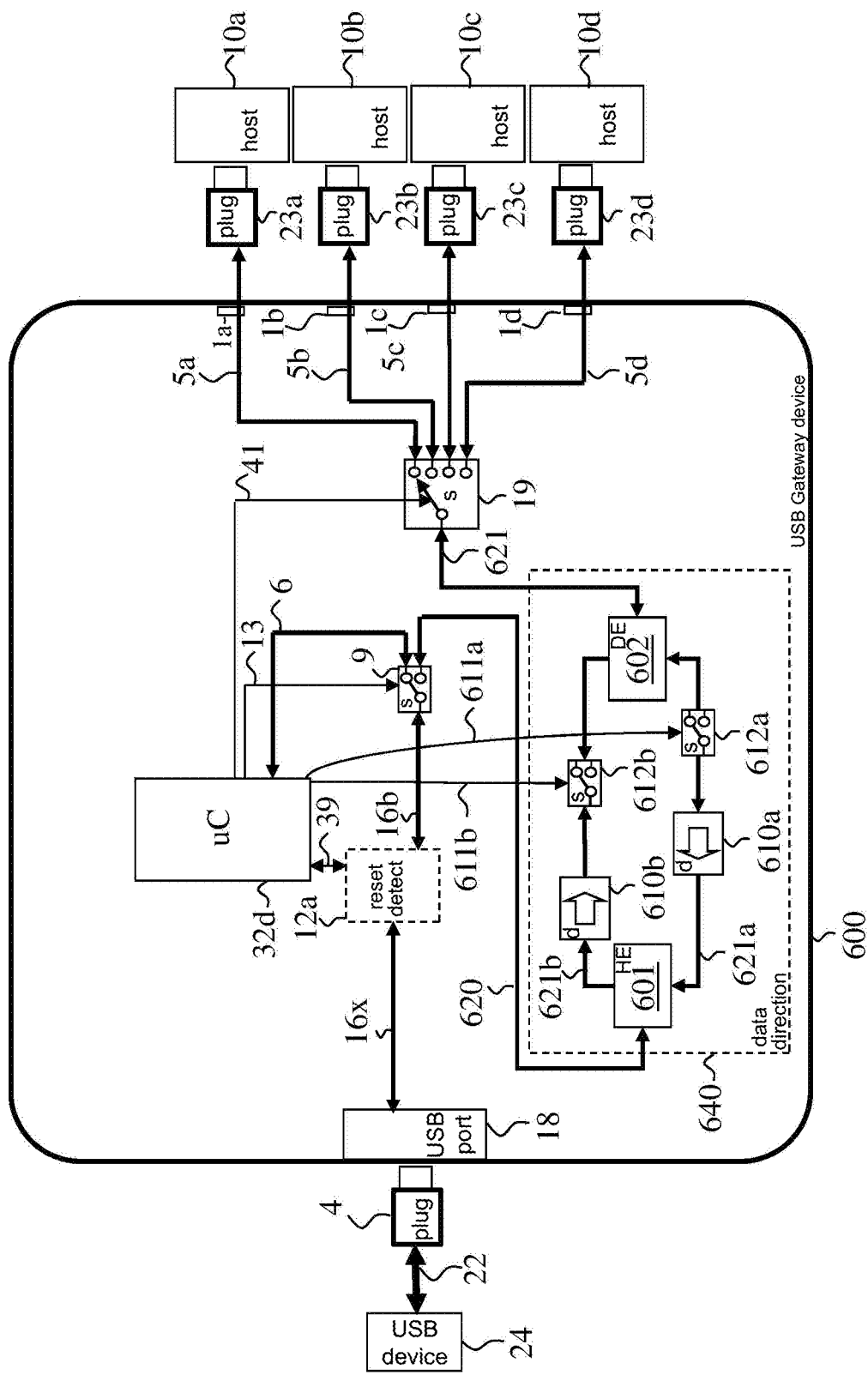
FIG. 12 Schematically illustrates a high-level block diagram of a Secure USB Gateway device according to another exemplary embodiment of the current invention having data directionality enforcement hardware.

FIG. 8 is adopted from FIG. 12 of the co-pending application Ser. No. 13/937,581 titled "Electro-Mechanic USB Locking Device" to the same inventor which is incorporated herein by reference, and illustrates a high-level block-diagram of a USB cable locking system 520 and an eLock device 23*x* having a solenoid that is driven by the attached USB device (for example Secure USB Gateway device 46 in this case). For brevity, only the main elements which are relevant for the current invention are marked and detailed herein.

The purpose of an eLock device 520 is to assure that only qualified equipment will be connected to a computer 10*x* by locking its USB cable 899 (internal electric channels 7*x* and 5*x* marked herein) to the host device USB port 531. This type of USB cable locking device may be used in conjunction with Secure KVM devices or Secure USB Gateway device 46. One advantage of such device is that it secures the device 46 to the host computers 10*x*. Such function may be useful to avoid an unauthorized changes in peripheral device connected to classified computer 10*x*.

In this exemplary embodiment of the invention, the USB cable locking device in USB plug 23*x* is mechanically secured inside USB jack 531 of computer 10*x* using a similar solenoid based mechanism as shown in FIGS. 3 to 12 of the co-pending application. In this embodiment the solenoid 524 is powered from a supply line (7*x* in this application) coupled through USB cable (7*x* and 5*x* of this application) exiting the USB plug 81*x*. To remove USB plug 23*x* from USB jack 531, solenoid 524 is energized and pulls metal pin or lever 523 that is loaded to the forward position when solenoid 524 is de-energized by spring 522. Metal pin or lever 523 is inserted inside release push-button 518 to prevent user activation of the release action when the electromechanical solenoid 524 is not energized.

Push-button 518 is mounted on a flexible leaf spring 516 having one or more locking teeth 508 that are designed to engage with shielding tab holes 534 inside standard USB jack 531, locking the plug 23*x* to the USB jack 531 to prevent its advertent, malicious, or inadvertent removal.

The attached USB device 46 switches on the power supplied by eLocks control function (66 in FIG. 6) through cable 7*x* to enable unlocking USB plug 23*x* from computer 10*x*.

It should be noted that the embodiment depicted in FIG. 8 herein may be less complex and less expensive than other options seen in the co-pending application, but it requires a non-standard USB port 1*x*, and non-standard USB cables.

Additionally or alternatively, other security measures may be used to prevent disconnecting the USB plugs from the hosts 10*x* or from the peripheral device 46.

It should be noted that once USB plug 23*x* is locked within USB jack 531, a user is prevented from inserting any other USB cable or a USB device into the occupied USB jack 531, thus hindering potential attack via the occupied USB jack 531.

FIG. 9 schematically illustrates a front view of a Secure USB Gateway device 46 according to an exemplary embodiment of the current invention having 4 ports USB switching function.

The figure shows the front panel 95 with its pushbuttons 35*x*, the corresponding LED 96*x*, Lock push-button 97, Lock indicator 98, and tamper evidence label 99.

It should be noted that this exemplary embodiment is given here as non-limiting example, and other types of controls and indicators may be used, for example a rotary control and graphical display as seen for example in FIGS. 7*a-b* and 20*a-f* of U.S. application 20110208963 titled "Secured KVM System Having Remote Controller-Indicator" to the same inventor may be used. Combinations of rotary pushbutton controls, indicators and graphical display may be used.

Figure 10:
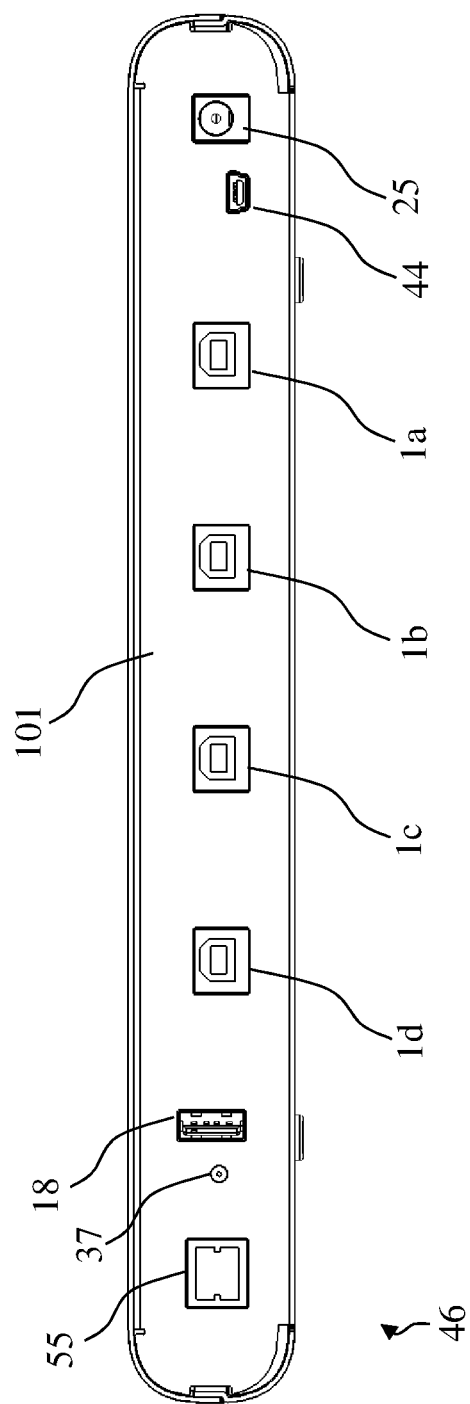

FIG. 10 schematically illustrates a back view of a Secure USB Gateway device 46 according to an exemplary embodiment of the current invention having 4 ports USB switching function.

Optionally the Rear panel 101 is a stamped metal sheet plate.

In the exemplary embodiment depicted here:
- USB Type B jacks 1*a* to 1*d* enables connection of USB cables to computers 10*a* to 10*d* respectively (not shown here).
- USB Type A jack 18 used to connect the USB peripheral device 24 (not shown here).
- DC jack 25 is used to connect the DC plug of the wall-mounted power supply 89 (not shown here).
- DCU jack 55 is standard RJ-14 or RJ-45.

Programming connector 44 is Mini-USB jack used to connect programmer PC.

Bi-color LED 37, seen here located near USB peripheral device jack 18, provides user indication of connected USB peripheral device status. Optionally, LED 37 is located near the connector at the back of Secure USB Gateway device 46. In normal operation, the user sees the front panel of Secure USB Gateway device 46, while an IT technician or administrator is allowed to connect/disconnect devices and to manage the profiles. Therefore the LED 37 is primarily intended for the administrator not for the user. However, LED 37 may be placed on the front of Secure USB Gateway device 46 to be viewed by the user during normal operation. Alternatively LED 37 may be duplicated on both front and back of Secure USB Gateway device 46.

It should be noted that other connectors' types or protocols may be used and are within the scope of the current invention.

FIG. 11 Schematically Illustrates the configuration utility screen 111 used with the Secure USB Gateway exemplary embodiment of the current invention.

This screen 111 is presented on the connected programmer 92 to enable configuration and monitoring of the device. It can be implemented as a program running locally at the programming computer 92 or as a web-server running inside the Secure USB Gateway device and being displayed in web-browser at the connected computer.

Screen 111 is divided into 3 main areas:
  Area 120*a* is the Device White-list area. The entries in lines in this area indicating the devices that are allowed (qualified) by the Secure USB Gateway device.
  Area 120*b* is the Device Black-list area. The entries in lines in this area indicating the devices that are not allowed (will be rejected) by the Secure USB Gateway device.
  Area 120*c* is the Device Read area. The entries in lines in this area are showing the captured parameters of the currently connected peripheral device.

To access screen 111, the user connects the programmer 92 to a Secure USB Gateway device 46 and activates the security application in programmer 92. The user or administrator would need a specific password to interact with a Secure USB Gateway device. Once password is authenticated at the programmer 92, and the programmer is authenticated by the Secure USB Gateway device 46—the current device policy will appear in this screen.

The user/administrator may enter new lines or drag and drop lines between the three areas—white-list, black-list and device read.

When entering a new line, the user/administrator may specify the following parameters (line number 102 is entered automatically by the system):

1. Column 103 is the USB Class ID. The user/administrator may enter this field to allow/reject specific class of USB peripheral devices.
    For example: class 03*h* is Human interface device (HID)—used by keyboard, mouse, joystick. If a value 03*h* is entered in the white-list, it will cause qualification of all USB devices having class 03*h*.
2. Column 104 is the USB Sub-Class ID. The user/administrator may enter this field to allow/reject specific sub-class of USB peripheral devices.
    For example: sub class 02*h*, If the value 02*h* is entered in the black-list will cause rejection of all USB devices having the designated class indicated in the corresponding Column 103 and sub-class 02*h*.
3. Column 105 is the USB Protocol. The user/administrator may enter this field to allow/reject specific protocol of USB peripheral devices.
    For example: protocol 01, If the value 01 is entered in the white-list will cause qualification of all USB devices having the designated class indicated in the corresponding Column 103 and sub-class indicated in the corresponding Column 104 and using communication protocol 01.
4. Column 106 is the USB Vendor ID (VID). The user/administrator may enter this field to allow/reject specific VID of USB peripheral devices.
5. Column 107 is the USB Product ID (PID). The user/administrator may enter this field to allow/reject specific PID of USB peripheral devices.
6. Column 108 is the USB unique serial number. (SN) The user/administrator may enter this field to allow/reject specific serial numbers or serial number ranges of USB peripheral devices.
7. Column 109 is the Map to field (available only for devices that support multiple computers). The user/administrator may enter in this field a + or − sign to indicate if that device can be mapped to the specific host computer 10*x*. From left to right the signs indicating mapping to host computers 10*a* to 10*d*.
8. Column 110 is the Direction field (available only for devices that support multiple computers and directional flow). The user/administrator may enter in this field:
    a. N for none (no communication of the corresponding host 10*x* to the specified device 24, this may be equivalent to inserting "−" in the corresponding location in 109 column, so as not to map the device to the corresponding host);
    b. R for read only (corresponding host 10*x* may only read from the specified device 24);
    c. W for write only (corresponding host 10*x* may only write to the specified device 24);
    d. RW for both read and write.

A notation convention is used, for example host designation from left to right, the signs indicating mapping to host computers 10*a* to 10*d*.

Note that in each textual input field "*" may be entered to indicate wild-card.

Additional column or pop-up box may be added to enable clicking to command USB eLock device to open.

Preferably, the logs may not be accessed via hosts 10*x* as host may not be trusted to be un-infected with hostile codes or otherwise compromised. Thus, these logs may preferably be accessed only using programmer 92. Optionally, programmer 92 comprises a processor capable of processing, analyzing and displaying data in these logs. Alternatively, programmer 92 is used for transferring the logs to a processor such as a PC for display and analysis. Optionally, processor 32 is selected to be strong enough to run the "web-server" and to support easy communication with programmer 92.

Screen 111 may be used for creating, displaying, or modifying the parameters in an authorization matrix associating authorized devices to hosts and to directions of data flow.

Preferably, the parameters of authorization matrix may not be accessed via hosts 10*x* as host may not be trusted to be un-infected with hostile codes or otherwise compromised. Similarly, device 24 may not be trusted to be un-infected with hostile codes or otherwise compromised. However, in some embodiments programming, accessing logs or other management operation may be permitted via a designated host, or any host. In some embodiments programming, accessing logs or other management operation may be permitted via USB port 18 using an authorized USB device.

FIG. 12 Schematically illustrates a high-level block diagram of a Secure USB Gateway device 600 according to another exemplary embodiment of the current invention having data directionality enforcement hardware.

The exemplary embodiment depicted in FIG. 12 is demonstrated as a modification of the embodiment seen in FIG. 6. Some elements seen in FIG. 6, which are not essential to this modification has been omitted from this figure. It should be apparent to a man skilled in the art that similar modifications may be made to other embodiments and are thus within the scope of the current invention.

In this embodiment, bidirectional data exchange 620 with peripheral device 24 is maintained (after qualification by microcontroller function 32*d*) by host emulator 601. Host emulator 601 split the data exchange to inbound data stream 621*a* and outbound data stream 621*b*.

Bidirectional communication 620 and registration with peripheral device 24 with host emulator 601 may be maintained in the event that only one of inbound data stream 621*a* or outbound data stream 621*b* is maintained, or even both are absent. Thus, peripheral device 24 may stay logically connected even in the event that a host is not connected (for example when attempting to connect device 24 to a host that is not allowed to be connected or when a host is missing or is turned off), or during switching from one host to the next. Thus time is saved when switching from one host to the next.

To ensure that data flows between a specific host 10*x* and device 24 is only in the allowed direction, each of the inbound data stream 621*a* and outbound data stream 621*b* passes through the corresponding data direction enforcement diode 610*x* and switch 612*x* placed between host emulator 601 and device emulator 602. Preferably, diodes 610*x* and switches 612*x* are hardware devices, and each of switches 612*x* are controlled by a corresponding unidirectional command lines 611*x* such that corruption of host emulator 601 and device emulator 602 by successful hacking may not create data flow in unauthorized direction. Alternatively, data directional enforcement is implemented within between host emulator 601 or device emulator 602.

Optionally the data direction enforcement subunit 640 is positioned between USB port 18 and host select switch 9 or implemented within USB enumeration and reset detector function 12*a*.

Figure 13:
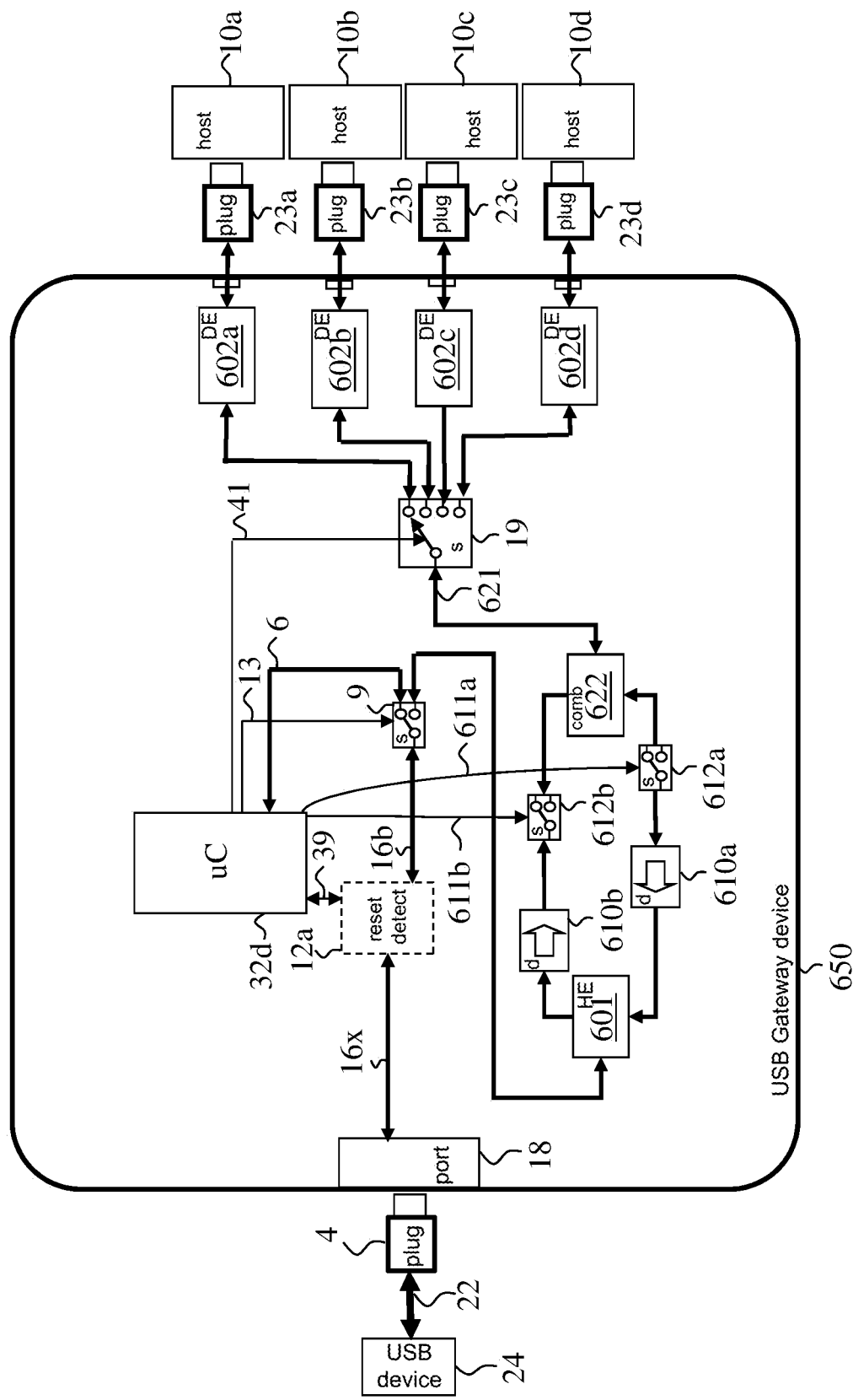
FIG. 13 Schematically illustrates a high-level block diagram of a Secure USB Gateway device according to another exemplary embodiment of the current invention having data directionality enforcement hardware.

FIG. 13 Schematically illustrates a high-level block diagram of a Secure USB Gateway device 650 according to another exemplary embodiment of the current invention having data directionality enforcement hardware.

One disadvantage of the gateway devices seen in FIGS. 6, 7 and 12 is that the peripheral device 24 is disconnect from the host 10*x* whenever the user switches from one host to another. This cases a delay cased by the time taken to device 24 and the newly connected host 10*x* to connect.

In the exemplary embodiment of FIG. 13, each host 10*a* to 10*d* is connected to a corresponding device emulator 602*a* to 602*d*. Preferably the device emulators 602*x* stays connected to their corresponding host 10*x* regardless of the position of host section switch 19.

Inbound data stream 621*a* and outbound data stream 621*b* are combined in data stream combiner 622 to a bidirectional data stream 621.

Figure 14:
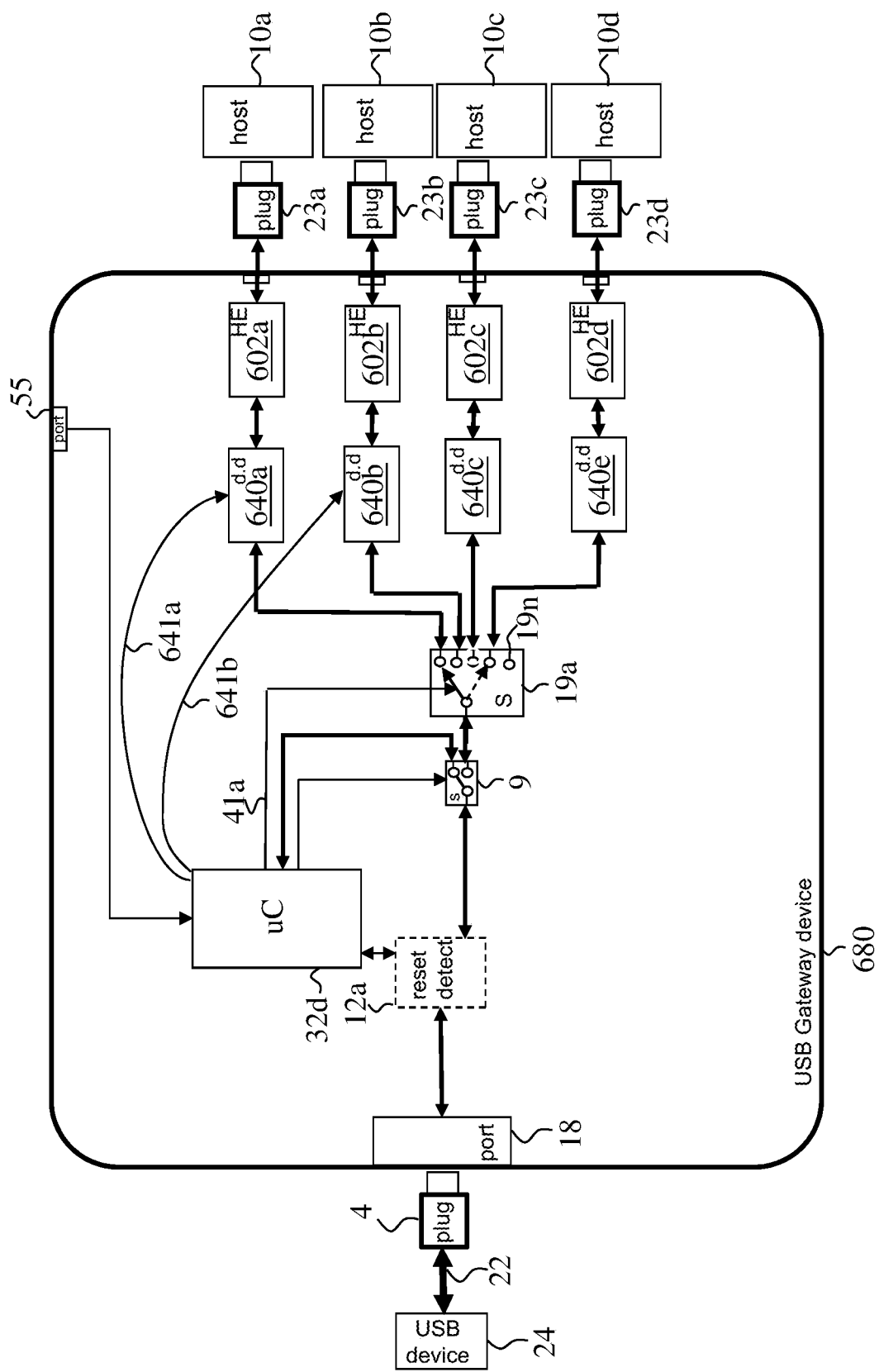
FIG. 14 Schematically illustrates a high-level block diagram of a Secure USB Gateway device according to yet another exemplary embodiment of the current invention having data directionality enforcement hardware.

FIG. 14 Schematically illustrates a high-level block diagram of a Secure USB Gateway device 680 according to yet another exemplary embodiment of the current invention having data directionality enforcement hardware.

In this exemplary embodiment, a corresponding data direction enforcement subunit 640*x* is positioned between host select switch 19*a* and host emulator 602*x*. Allowed data direction of each data direction enforcement subunit 640*x* is controlled via the corresponding command channel 641*x* (only 641*a* and 641*b* are seen to avoid cluttering the figure).

As each data direction enforcement subunit 640*x* is also capable to prevent data flow completely, host selection switch 19*a* may be a multiplexor connecting mode select switch 9 to few or even all data direction enforcement subunit 640*x* at the same time. This type of operation may be useful for example when data has to be shared in real time or near real time among few hosts, yet data leak from one host to another is to be avoided.

For example device 24 may be a surveillance camera to be viewed or recoded by several hosts 10*x*. Another example may be when device 24 is a mass storage device wherein only one (preferably trusted) host is authorized to write to it while the other hosts are capable of only reading from it. Other examples of devices that may require "read only" by all hosts may be: data base mass storage device, Touchscreen, scanner, camera, or other sensors. Examples of devices that may require "write only" by all hosts may be: backup mass storage device, shared printer, etc.

Optionally host selection switch 19*a* (and optionally also host selection switch 19) may further comprise an idle (not connected) position 19*n*.

The embodiments depicted in FIGS. 13 and 14 allow rapid host switching without device connection delay, optionally faster than the rate that a human can perform. These embodiments are thus suitable for automated operation.

For example, device 24 may request to communicate with a specific host. The request may be intercepted by USB enumeration and reset detector function 12*a* that relays the request to by microcontroller 32*d* via channel 39. If the request is granted microcontroller 32*d* issues the appropriate commands on lines 621*x*, 41, 41*a* and/or 641*x*. Alternatively, automatic scheduling and routing unit or system may be connected to the DCU port 55 to request rapid host switching.

Optionally a USB hub may be inserted USB port 18 and thus a plurality of devices 24 may be used in parallel. This application may not provide the highest level of security as the hub may mask the true identity of the connected device. Thus, for secure applications hubs are black listed.

Optionally a keyboard and mouse are used as device 24 and the gateway is thus functions as a KV device. Optionally, enumeration and reset detector function 12*a* monitors the communication with the keyboard and mouse and interprets commands to switch among the connected hosts.

It should be noted that the term "host", "host device" or "host computer" may be any electronic or computing device having a USB female USB jack.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

In this document the term "microcontroller function" or other references to "function" or "functions" refer to hardware capable of performing the logical function. The hardware may comprise one or a plurality of electronic circuitries. The hardware may be based on an ASIC (Application Specific Integrated Circuit), a processor accompanied with the necessary memory, a programmable device such as FPGA (Field Programmable Gate Array), or other device or devices capable of performing the desired function. The block diagrams seen here may refer to the function (rather then the hardware sub-units) since modern logical hardware are capable of performing several functions. Thus, a plurality of logical functions may be performed by the same hardware. Alternatively, each logical function may be performed by a dedicated hardware, for example a single chip, or several chips. A man skilled in the art of electronics may find several ways to realize and implement the "function" or "functions". All such implementations are within the scope of this invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A secure USB filter device comprising:
   a USB jack, to connect to a USB device;
   a USB host emulator,
      coupled to said USB jack, to emulate a host computer in front of said USB device;
   at least a first USB host port,
      to connect to a first host computer;
   at least a first USB device emulator,
      coupled to said first host computer via said at least first USB host port,
      to emulate said USB device in front of said first host computer;
   a system controller, coupled to said USB host emulator for monitoring and providing management and security for the secure USB filter device by allowing only approved USB device to interact with said first host computer; and
   an illuminated push-button switch coupled to a timer such that:
      pressing said illuminated push-button switch allows connecting said USB device for a preset duration of time, and wherein said illuminated push-button switch provides
      indication that said USB device is coupled to a selected host computer.

2. The secure USB filter device of claim 1, further comprising:
   an enclosure, enclosing the secure USB filter device;
   tampering sensor, for detecting tampering with the integrity of said enclosure; anti-tampering function, to permanently disabling the secure USB filter device when tampering attempt was detected by said tampering sensor; and a power source, for providing backup power for the anti-tampering function and the tampering sensor to enable detection even when the secure USB filter device is unpowered.

3. The secure USB filter device of claim 1, further comprising:
   at least a first security microcontroller;
   at least a first host USB hub,
   coupled to said first host computer, to said host USB emulator, and said first USB device emulator,
   to verify that said USB device is connected and only to an approved first host computer.

4. The secure USB filter device of claim 1, further comprising:
   at least a second USB host port,
      to connect to a second host computer;
   a channel selector,
      for user selecting one selected host computer among said first host computer and said second host computer to be connected to said USB device; and
   a multiplexer, controlled by said channel selector,
      coupling said USB host emulator to said selected host computer.

5. The secure USB filter device of claim 4, further comprising:
   at least a second device emulator, such that:

said first USB device emulator is connected between said multiplexer and said first host computer, and said second device emulator is connected between said multiplexer and said second host computer.

6. The secure USB filter device of claim 4, further comprising:

a Desktop Controller Unit (DCU) port to enable remote controlling and monitoring of the secure USB filter device.

7. The secure USB filter device of claim 6, further comprising a lock push-button located on the front panel of the secure USB filter device, wherein pressing said lock push-button locks said one selected host computer.

8. The secure USB filter device of claim 1, wherein said system controller comprises a non-volatile memory containing a table comprising USB device qualifications of qualified USB devises that are allowed to be connected to a host computer, said USB device qualifications are selected from a group consisting of: Class ID, Sub-class ID, Protocol, Class ID, sub-class ID, Protocol, Vendor ID, Product ID, and Serial Number.

9. The secure USB filter device of claim 8, wherein said table further comprises USB host port qualifications associating qualified USB devices that are allowed to be connected to said first USB host port, wherein said USB host port qualifications enforce direction of data flow selected from the group of: only from a selected host computer to the USB device; only from the USB device to the selected host computer; bidirectional data flow; and no data flow at all.

10. The secure USB filter device of claim 8, wherein said table in said non-volatile memory is not re-programmable.

11. The secure USB filter device of claim 8, further comprising a programming port for connecting a programming device for reprogramming said table in said non-volatile memory.

12. The secure USB filter device of claim 11, wherein said table in said non-volatile memory can only be reprogrammed via said programming device.

13. The secure USB filter device of claim 1, wherein said USB device is a USB device of a preset class and wherein said first USB device emulator is to emulate only a generic USB device of the same preset class as said USB device of a preset class.

14. The secure USB filter device of claim 13, wherein said USB device of a known class is selected from the group consisting: a keyboard, and a mouse.

15. The secure USB filter device of claim 13, wherein the USB filter device is attached to the motherboard of said host computer, and is within the enclosure of said host computer.

16. The secure USB filter device of claim 15, wherein:

the USB filter device is in a form factor of a USB jack, the USB filter is soldered to said motherboard of said host computer, and the electronic circuitry of the USB filter device is housed inside a metal sheet cover of said USB jack.

17. The secure USB filter device of claim 13, wherein the USB filter device is inserted into a USB jack of said host computer.

18. The secure USB filter device of claim 17, wherein the USB filter device is locked to a USB jack of said host computer.

19. The secure USB filter device of claim 17, wherein said system controller is capable of disabling said USB filter device if a USB device of a class other then said USB device of a preset class is connected to said USB jack.

20. The secure USB filter device of claim 13, further comprising a unidirectional data link enforcing unidirectional data flow only from said USB host emulator to said USB device emulator.

* * * * *